(12) United States Patent
Sillerman

(10) Patent No.: US 8,732,739 B2
(45) Date of Patent: May 20, 2014

(54) SYSTEM AND METHOD FOR TRACKING AND REWARDING MEDIA AND ENTERTAINMENT USAGE INCLUDING SUBSTANTIALLY REAL TIME REWARDS

(75) Inventor: Robert F. X. Sillerman, New York, NY (US)

(73) Assignee: Viggle Inc., New York, NY (US)

( * ) Notice: Subject to any disclaimer, the term of this patent is extended or adjusted under 35 U.S.C. 154(b) by 0 days.

(21) Appl. No.: 13/552,546

(22) Filed: Jul. 18, 2012

(65) Prior Publication Data
US 2013/0145390 A1 Jun. 6, 2013

Related U.S. Application Data

(60) Provisional application No. 61/509,021, filed on Jul. 18, 2011.

(51) Int. Cl.
*H04N 7/173* (2011.01)
*G06Q 30/02* (2012.01)
*H04N 5/445* (2011.01)

(52) U.S. Cl.
USPC ............. 725/18; 725/19; 725/23; 725/38

(58) Field of Classification Search
USPC ........... 725/9, 23, 18, 19, 20, 14, 38; 704/270
See application file for complete search history.

(56) References Cited

U.S. PATENT DOCUMENTS

| | | |
|---|---|---|
| 2,776,374 A | 1/1957 | Iskenderian |
| 3,651,471 A | 3/1972 | Haselwood et al. |
| 3,742,462 A | 6/1973 | Haselwood et al. |
| 3,742,463 A | 6/1973 | Haselwood et al. |
| 3,772,649 A | 11/1973 | Haselwood et al. |
| 3,919,479 A | 11/1975 | Moon et al. |
| 3,973,206 A | 8/1976 | Haselwood et al. |
| 4,025,851 A | 5/1977 | Haselwood et al. |
| 4,048,562 A | 9/1977 | Haselwood et al. |
| 4,179,212 A | 12/1979 | Lahr |

(Continued)

FOREIGN PATENT DOCUMENTS

| WO | WO8702773 | 5/1987 |
|---|---|---|
| WO | WO9930488 | 6/1999 |

(Continued)

OTHER PUBLICATIONS

Ozer et al., "A Graph Based Object Description for Information Retrieval in Digital Image and Video Libraries," Dept. of Electrical and Computer Engineering, New Jersey Institute of Technology, Newark, NJ, USA, pp. 1-5. Last Accessed, Nov. 11, 2003.

(Continued)

*Primary Examiner* — Pankaj Kumar
*Assistant Examiner* — Reuben M Brown
(74) *Attorney, Agent, or Firm* — Loeb & Loeb LLP

(57) ABSTRACT

The present invention relates to systems and methods for rewarding entertainment consumers, and more specifically to a system and method for rewarding people for watching or otherwise engaging in various forms of media and entertainment (e.g. broadcast TV, on-demand TV, games, live entertainment, movies, and radio) to promote loyalty to or improve recognition of all entertainment, while collecting useful data about the media consumption habits as well as the rewards consumption patterns associated with those consumers.

53 Claims, 17 Drawing Sheets

(56) References Cited

U.S. PATENT DOCUMENTS

| | | |
|---|---|---|
| 4,208,652 A | 6/1980 | Marshall |
| 4,230,990 A | 10/1980 | Lert, Jr. et al. |
| 4,286,255 A | 8/1981 | Siy |
| 4,441,205 A | 4/1984 | Berkin et al. |
| 4,450,531 A | 5/1984 | Kenyon et al. |
| 4,495,644 A | 1/1985 | Parks et al. |
| 4,547,804 A | 10/1985 | Greenberg |
| 4,565,927 A | 1/1986 | Ragle |
| 4,599,644 A | 7/1986 | Fischer |
| 4,639,799 A | 1/1987 | Inoue |
| 4,641,350 A | 2/1987 | Bunn |
| 4,646,352 A | 2/1987 | Asai et al. |
| 4,677,466 A | 6/1987 | Lert, Jr. et al. |
| 4,697,209 A | 9/1987 | Kiewit et al. |
| 4,718,106 A | 1/1988 | Weinblatt |
| 4,739,398 A | 4/1988 | Thomas et al. |
| 4,747,147 A | 5/1988 | Sparrow |
| 4,750,034 A | 6/1988 | Lem |
| 4,790,564 A | 12/1988 | Larcher et al. |
| 4,797,937 A | 1/1989 | Tajima |
| 4,857,999 A | 8/1989 | Welsh |
| 4,888,638 A | 12/1989 | Bohn |
| 4,918,730 A | 4/1990 | Schulze |
| 4,945,412 A | 7/1990 | Kramer |
| 4,955,070 A | 9/1990 | Welsh et al. |
| 4,959,870 A | 9/1990 | Tachikawa |
| 4,967,273 A | 10/1990 | Greenberg |
| 5,019,899 A | 5/1991 | Boles et al. |
| 5,023,929 A | 6/1991 | Call |
| 5,159,667 A | 10/1992 | Borrey et al. |
| 5,210,820 A | 5/1993 | Kenyon |
| 5,245,533 A | 9/1993 | Marshall |
| 5,327,520 A | 7/1994 | Chen |
| 5,355,161 A | 10/1994 | Bird et al. |
| 5,481,294 A | 1/1996 | Thomas et al. |
| 5,504,518 A | 4/1996 | Ellis et al. |
| 5,550,928 A | 8/1996 | Lu et al. |
| 5,579,471 A | 11/1996 | Barber et al. |
| 5,586,197 A | 12/1996 | Tsujimura et al. |
| 5,617,506 A | 4/1997 | Burk et al. |
| 5,729,742 A | 3/1998 | Harbinski et al. |
| 5,799,098 A | 8/1998 | Ort et al. |
| 5,805,746 A | 9/1998 | Miyatake et al. |
| 5,852,823 A | 12/1998 | De Bonet |
| 5,859,935 A | 1/1999 | Johnson et al. |
| 5,901,178 A | 5/1999 | Lee et al. |
| 5,913,205 A | 6/1999 | Jain et al. |
| 5,918,223 A | 6/1999 | Blum et al. |
| 6,035,055 A | 3/2000 | Wang et al. |
| 6,041,133 A | 3/2000 | Califano et al. |
| 6,092,069 A | 7/2000 | Johnson et al. |
| 6,119,124 A | 9/2000 | Broder et al. |
| 6,181,818 B1 | 1/2001 | Sato et al. |
| 6,195,447 B1 | 2/2001 | Ross |
| 6,202,151 B1 | 3/2001 | Musgrave et al. |
| 6,209,028 B1 | 3/2001 | Walker et al. |
| 6,263,505 B1 | 7/2001 | Walker et al. |
| 6,269,362 B1 | 7/2001 | Broder et al. |
| 6,397,198 B1 | 5/2002 | Hoffman et al. |
| 6,400,890 B1 | 6/2002 | Nagasaka et al. |
| 6,415,000 B1 | 7/2002 | Hirzalla et al. |
| 6,445,818 B1 | 9/2002 | Kim et al. |
| 6,445,822 B1 | 9/2002 | Crill et al. |
| 6,445,834 B1 | 9/2002 | Rising, III |
| 6,463,426 B1 | 10/2002 | Lipson et al. |
| 6,477,269 B1 | 11/2002 | Brechner |
| 6,496,228 B1 | 12/2002 | McGee et al. |
| 6,502,105 B1 | 12/2002 | Yan et al. |
| 6,549,757 B1 | 4/2003 | Masse et al. |
| 6,574,378 B1 | 6/2003 | Lim |
| 6,607,136 B1 | 8/2003 | Atsmon et al. |
| 6,633,651 B1 | 10/2003 | Hirzalla et al. |
| 6,633,654 B2 | 10/2003 | Hannigan et al. |
| 6,721,449 B1 | 4/2004 | Krishnamachari |
| 6,766,523 B2 * | 7/2004 | Herley ........................... 725/19 |
| 6,901,378 B1 | 5/2005 | Linker et al. |
| 6,938,157 B2 | 8/2005 | Kaplan |
| 6,999,715 B2 | 2/2006 | Hayter et al. |
| 7,039,931 B2 | 5/2006 | Whymark |
| 7,042,525 B1 | 5/2006 | Yu |
| 7,228,293 B2 | 6/2007 | DeTreville |
| 7,280,970 B2 | 10/2007 | Tamir et al. |
| 7,392,233 B2 | 6/2008 | Tanaka |
| 7,434,243 B2 | 10/2008 | Lyda |
| 7,706,838 B2 | 4/2010 | Atsmon et al. |
| 7,730,506 B1 | 6/2010 | Lyda |
| 7,770,116 B2 * | 8/2010 | Zhang et al. ................. 715/716 |
| 7,991,770 B2 | 8/2011 | Covell et al. |
| 8,411,977 B1 | 4/2013 | Baluja et al. |
| 8,442,125 B2 | 5/2013 | Covell et al. |
| 8,479,255 B2 | 7/2013 | Brauel et al. |
| 2001/0044719 A1 | 11/2001 | Casey |
| 2002/0023220 A1 | 2/2002 | Kaplan |
| 2003/0003990 A1 | 1/2003 | Von Kohorn |
| 2004/0255322 A1 * | 12/2004 | Meadows et al. ................ 725/23 |
| 2005/0063667 A1 | 3/2005 | Herley |
| 2005/0147256 A1 | 7/2005 | Peters et al. |
| 2005/0198317 A1 | 9/2005 | Byers |
| 2006/0020963 A1 | 1/2006 | Weinblatt et al. |
| 2006/0253330 A1 | 11/2006 | Maggio et al. |
| 2006/0282317 A1 * | 12/2006 | Rosenberg ..................... 705/14 |
| 2007/0100699 A1 | 5/2007 | Ajizadeh |
| 2007/0124757 A1 * | 5/2007 | Breen ............................ 725/18 |
| 2007/0143778 A1 | 6/2007 | Covell et al. |
| 2007/0280638 A1 | 12/2007 | Aoki et al. |
| 2007/0283380 A1 | 12/2007 | Aoki et al. |
| 2008/0071537 A1 | 3/2008 | Tamir et al. |
| 2008/0082995 A1 * | 4/2008 | Tanaka et al. .................. 725/18 |
| 2008/0276279 A1 | 11/2008 | Gossweiler et al. |
| 2009/0077578 A1 * | 3/2009 | Steuer et al. .................... 725/18 |
| 2009/0132894 A1 | 5/2009 | Xu et al. |
| 2009/0234889 A1 | 9/2009 | Dupree |
| 2009/0248700 A1 | 10/2009 | Amano et al. |
| 2009/0254933 A1 * | 10/2009 | Gupta et al. .................... 725/14 |
| 2009/0276802 A1 | 11/2009 | Amento et al. |
| 2009/0293079 A1 | 11/2009 | McKee et al. |
| 2009/0300143 A1 | 12/2009 | Musa et al. |
| 2010/0037277 A1 | 2/2010 | Flynn-Ripley et al. |
| 2010/0064307 A1 | 3/2010 | Malhotra et al. |
| 2010/0088156 A1 | 4/2010 | Wilson |
| 2010/0094686 A1 | 4/2010 | Henshaw et al. |
| 2010/0095326 A1 | 4/2010 | Robertson, III |
| 2010/0099446 A1 | 4/2010 | Panigrahi et al. |
| 2010/0100417 A1 | 4/2010 | Nussel et al. |
| 2010/0131987 A1 * | 5/2010 | Kent et al. ....................... 725/55 |
| 2010/0153999 A1 | 6/2010 | Yates |
| 2010/0162312 A1 | 6/2010 | Heilbron et al. |
| 2010/0169153 A1 | 7/2010 | Hwacinski et al. |
| 2010/0169917 A1 | 7/2010 | Harboe et al. |
| 2010/0256976 A1 | 10/2010 | Atsmon et al. |
| 2011/0035035 A1 | 2/2011 | Khan et al. |
| 2011/0078719 A1 * | 3/2011 | Kenyon et al. .................. 725/19 |
| 2011/0082807 A1 | 4/2011 | Parekh et al. |
| 2011/0113439 A1 | 5/2011 | Delegue et al. |
| 2011/0209191 A1 | 8/2011 | Shah |
| 2011/0307399 A1 | 12/2011 | Holmes |
| 2012/0173320 A1 | 7/2012 | Kail et al. |
| 2012/0192239 A1 * | 7/2012 | Harwell et al. ............... 725/109 |
| 2013/0067515 A1 * | 3/2013 | Barish ............................ 725/38 |
| 2013/0178966 A1 * | 7/2013 | Magnusson et al. ............ 700/94 |

FOREIGN PATENT DOCUMENTS

| | | |
|---|---|---|
| WO | WO0007330 | 2/2000 |
| WO | WO0106440 A1 | 1/2001 |
| WO | WO0217539 A2 | 2/2002 |

OTHER PUBLICATIONS

Pass et al., "Comparing Images Using Color Coherence Vectors," Computer Science Department, Cornell University, Ithaca, NY, USA, ACM Multimedia 96, Boston, MA, USA, 1996, pp. 65-73.

Pentland et al., "Photobook: Content-Based Manipulation of Image Databases," Perceptual Computing Section, The Media Laboratory,

(56) References Cited

OTHER PUBLICATIONS

Massachusetts Institute of Technology, Cambridge, MA, USA, International Journal of Computer Vision 18(3), 1996, pp. 233-254.
Pentland et al., "View-Based and Modular Eigenspaces for Face Recognition," Perceptual Computing Group, The Media Laboratory, Massachusetts Institute of Technology, Cambridge, MA, USA, 1994 IEEE, pp. 84-91.
Petkovic et al., "Recent applications of IBM's query by image content (QBIC)," SAC '96 Proceeding of the 1996 ACM symposium on Applied Computing, 1996, pp. 2-6.
Pfeiffer et al., "Automatic Audio Content Analysis," University of Mannheim, Mannheim, Germany, ACM Multimedia 96, Boston, MA, USA, 1996, pp. 21-30.
Ratha et al., "A Real-Time Matching System for Large Fingerprint Databases," Department of Computer Science, Michigan State University, MI, USA, IEEE Transactions on Pattern Analysis and Machine Intelligence, vol. 18, No. 8, East Lansing, MI, USA, Aug. 1998, pp. 799-813.
Ravela et al., "Image Retrieval by Appearance," Computer Vision Lab., Multimedia Indexing and Retrieval Group, Center for Intelligent Information Retrieval, University of Massachusetts at Amherst, SIGIR 97 Philadelphia PA, USA, 1997, pp. 278-285.
Rolland et al., "Musical Content-Based Retrieval: an Overview of the Merodiscov Approach and System," ACM Multimedia '99 10/99, Orlando, FL, USA, pp. 81-84.
Schmid et al., "Combining greyvalue invariants with local constraints for object recognition," Gravir, Saint-Martin, 1996 IEEE, pp. 872-877.
Shyu et al., "Assert: A Physidan-in-the-Loop Content-Based Retrieval System for HRCT Image Databases," School of Electrical and Computer Engineering, Purdue University, West Lafayette, IN, USA, Computer Vision and Image Understanding, vol. 75, Nos. 1/2, Jul./Aug., 1999, pp. 111-132.
Smith et al., "Image Classification and Querying Using Composite Region Templates," IBM T.J. Watson Research Center, Hawthorne, NY, USA, To appear in journal of Computer Vision and Image Understanding—special issue on Content-Based Access of Image and Video Libraries, pp. 1-36. Last Accessed, Nov. 11, 2013.
Smith et al., "Integrated Spatial and Feature image Query," IBM T.J. Watson Research Center, Hawthorne, NY, USA, Multimedia Systems 7: (1999), pp. 129-140.
Smith et al., "Quad-Tree Segmentation for Texture-Based Image Query," Center for Telecommunications Research and Electrical Engineering Department, Columbia University, New York, NY, USA, Multimedia 94-0/94 San Francisco, CA, USA. 1994, pp. 279-286.
Smith et al., "Querying by Color Regions using the VisualSEEk Content-Based Visual Query System," Center for Image Technology for New Media and Department of Electrical Engineering, Columbia University, New York, NY, USA, pp. 1-19, Last Accessed, Nov. 11, 2013.
Smith et al., "Single Color Extraction and image Query," Columbia University, Center for Telecommunications Research, Image and Advanced Television Laboratory, New York, NY, USA (To appear at the International Conference on Image Processing (ICIP-95), Washington, DC, Oct. 1995), pp. 1-4.
Smith et al., "VisualSEEk: a fully automated content-based image query system," Department of Electrical Engineering and Center for Image Technology for New Media, Columbia University, New York, NY, USA, ACM Multimedia 96, Boston, MA, USA, pp. 87-98. Last Accessed, Nov. 11 , 2013.
Subromanya et al., "Use of Transforms for Indexing in Audio Databases," Deparment of Computer Science, University of Missouri-Rolla, Rolla, MO, USA, pp. 1-7. Last Accessed, Nov. 11, 2013.
Swanson et al., "Robust audio watermarking using perceptual masking," Department of Electrical Engineering, University of Minnesota, Minneapolis, MN, USA, Signal Processing 66 (1998), pp. 337-355.
Toivonen et al, "Discovery of Frequent Patterns in Large Data Collections," Department of Computer Science, Series of Publications A, Report A-1996-5, University of Helsinki, Finland, pp. 1-127.

Torres et al., "User modelling and adaptivity in visual information retrieval systems," Distributed Multimedia Research Group, Computing Dept., Lancaster University, USA, pp. 1-6. Last Accessed, Nov. 11, 2013.
Uchida et al., "Fingerprint Card Classification with Statistical Feature Integration," Fourteenth International Conference on Pattern Recognition, C&C Media Laboratories, NEC Corporation, Kawasaki, Japan, Aug. 16-20, 1998, pp. 1-42.
Uitdenbogerd et al., "Manipulation of Music for Melody Matching," Department of Computer Science, RMIT, Melbourne, Victoria, Australia, ACM Multimedia 1998, Bristol, UK, pp. 235-240.
Uitdenbogerd et al., "Melodic Matching Techniques for Large Music Databases," Department of Computer Science, RMIT University, Melbourne, Australia, ACM Multimedia 1999, Orlando, FL, USA, pp. 57-66.
Veltkamp et al., "Content-Based Image Retrieval Systems: A Survey," Department of Computing Science, Utrecht University, Oct. 28, 2002, Revised and extended version of Technical Report UU-CS-2000-34, Oct. 2000, pp. 1-62.
Wactlar et al., "Intelligent Access to Digital Video: Informedia Project," Carnegie Mellon University, 1996 IEEE, pp. 46-52.
Wang et al., "Content-based Image Indexing and Searching Using Daubechies' Wavelets," Department of Computer Science and School of Medicine, Stanford University, Stanford, CA, USA, pp. 1-10. Last Accessed, Nov. 11, 2013.
Wang et al., "Wavelet-Based Image Indexing Techniques with Partial Sketch Retrieval Capability," Stanford University, Stanford, CS, USA, Proceedings of the Fourth Forum on Research and Technology Advances in Digital Libraries, 1997, pp. 1-12.
Wold et al., "Classification, Search, and Retrieval of Audio," Muscle Fish LLC, Berkeley, CA, USA, CRC Handbook of Multimedia Computing 1999, pp. 1-19.
Wold et al., "Content-Based Classification, Search, and Retrieval of Audio," Muscle Fish, 1996 IEEE, pp. 27-36.
Yang et al , "A Study on Retrospective and On-Line Event Detection," School of Computer Science, Carnegie Mellon University, Pittsburgh, PA, USA, SIGIR '98, Melbourne, Australia, 1998 ACM, pp. 28-36.
Yoshitaka et al., "A Survey on Content-Based Retrieval for Multimedia Databases," Faculty of Engineering, Hiroshima University, Hiroshima, Japan, IEEE Transactions on Knowledge and Data Engineering, vol. 11, No. 1, Jan./Feb. 1999, pp. 81-93.
International Searching Authority, "Search Report", issued in connection with International Application No. PCT/US12/47245 mailed Oct. 5, 2012, 2 pages.
Abe et al., "Content-Based Classification of Audio Signals Using Source and Structure Modeling," HNC Development Center, Sony Corporation, Tokyo, Japan, pp. 1-4. Last Accessed, Nov. 11, 2013.
Adjeroh et al., "Multimedia Database Management—Requirements and Issues," The Chinese University of Hong Kong, IEEE MultiMedia, Jul.-Sep. 1997, pp. 24-33.
Ahuja et al., "Extraction of Early Perceptual Structure in Dot Patterns: Integrating Region, Boundary, and Component Gestalt," Coordinated Science Laboratory, University of Illinois at Urbana-Champaign, Urbana, IL, USA, Computer Vision, Graphics and Image Processing 48, (1989), pp. 304-356.
Allan et al., "On-line New Event Detection and Tracking," Center for Intelligent Information Retrieval, Computer Science Department, University of Massachusetts, Amherst, MA, USA, SIGIR '98, Melbourne, Australia 1998 ACM 1-58113-015-5 8/98, pp. 37-45.
Ardizzo et al., "Content-Based Indexing of Image and Video Databases by Global and Shape Features," Universita di Palermo, Dipartimento di Ingegneria Elettrica, Palermo, Italy, 1996 IEEE, Proceedings of ICPR '96, pp. 140-144.
Bainbridge et al., "Towards a Digital Library of Popular Music," University of Waikato, Hamilton, New Zealand & Rutgers University, New Jersey, USA, pp. 1-9. Last Accessed, Nov. 11, 2013.
Bigün et al., "Orientation Radiograms for Image Retrieval: an Alternative to Segmentation," Signal Processing Laboratory, Swiss Federal Institute of Technology, Lausanne, Switzerland, 1996 IEEE, Proceedings of ICPR '96, pp. 346-350.

(56) References Cited

OTHER PUBLICATIONS

Campbell et al., "Copy Detection Systems for Digital Documents," Brigham Young University, Department of Computer Science, Provo, UT, USA, 0-7695-0659-3/00, 2000 IEEE, pp. 1-11.
Cano et al., "Score-Performance Matching using HMMs," Audiovisual Institute, Pompeu Fabra University, Barcelona, Spain, pp. 1-4. Last Accessed, Nov. 11, 2013.
Cantoni et al., "Recognizing 2D Objects by a Multi-Resolution Approach," Dipartimento di Informatica e Sistemostica, Universitta di Pavia, Italy, 1051-4651/94 1994 IEEE, pp. 310-316.
Carson et al., "Blobworld: A System for Region-Based Image Indexing and Retrieval," EECS Department, University of California, Berkeley, CA, USA, Dionysius P. Huijsmans, Arnold W.M. Smeulders (Eds.) Visual '99, LNCS 1614, 1999, pp. 509-517.
Cha et al., "Object-Oriented Retrieval Mechanism for Semistructured Image Collections," Department of Multimedia Engineering, Tongmyong University of Information Technology, Pusan, South Korea, ACM Multimedia '98, Bristol, UK, pp. 323-332.
Chang et al., "Extracting Multi-Dimensional Signal Features for Content-Based Visual Query," Department of Electrical Engineering & Center for Telecommunications Research, Columbia University, New York, NY, USA, SPIE Symposium on Visual Communications and Signal Processing, May 1995, pp. 1-12.
Chang et al "Multimedia Search and Retrieval," Columbia University, Department of Electrical Engineering. New York, NY, USA, Published as a chapter in Advances in Multimedia: Systems, Standards, and Networks, A Puri and T. Chen (eds.), New York: Marcel Dekker, 1999, pp. 1-26.
Chen et al., "Content-based Video Data Retrieval," Department of Computer Science, National Tsing Hua University, Taiwan, R.O.C., Proc. Natl. Sci. Couns. ROC(A) vol. 23, No. 4, 1999, pp. 449-465.
Christel et al., "Evolving Video Skims Into Useful Multimedia Abstractions," Carnegie Mellon University, Pittsburgh, PA, USA, CHI 98 Apr. 18-23, 1998, pp. 171-178.
Christel et al., "Multimedia Abstractions for a Digital Video Library," HCI Institute and CS Dept., Carnegie Mellon University, Pittsburgh, PA, USA, in Proceedings of ACM Digital Libraries '97 Conference, Philadelphia, PA; USA, Jul. 1997, pp. 21-29.
Colombo et al., "Retrieval of Commercials by Video Semantics," 1998 IEEE Computer Society Conference on Computer vision and Pattern Recognition, Jun. 23-25, 1998, Santa Barbara, CA, USA, pp. 1-17.
De Gunst et al., "Knowledge-Based Updating of Maps by Interpretation of Aerial Images," Delft University of Technology, Fac. of Geodetic Engineering, The Netherlands, 1051-4651/94 1904 IEEE, pp. 811-814.
Faloutsos et al., "Efficient and Effective querying by Image Content," Department of Computer Science, University of Maryland, MD, USA, Journal of Intelligent Information Systems, 3, 231-161 (1994), pp. 231-262.
Flickner et al., "Query by Image and Video Content: The QBIC System," IBM Almaden Research Center, 1995 IEEE, Sep. 1995, pp. 23-32.
Foote, "Content-Based Retrieval of Music and Audio," Institute of Systems Science, National University of Singapore, Heng Mui Keng Terrace, Kent Ridge, Singapore, pp. 1-10. Last Accessed, Nov. 11, 2013.
Foote, "Automatic Audio Segmentation Using a Measure of Audio Novelty," FX Palo Alto Laboratory, Inc., pp. 1-4. Last Accessed, Nov. 11, 2013.
Fujiwara et al., "Dynamic Miss-Counting Algorithms: Finding Implication and Similarity Rules with Confidence Pruning," Hitachi Ltd., Central Research Laboratory, pp. 1-11. Last Accessed, Nov. 11, 2013.
Gerhard, "Ph.D. Depth Paper: Audio Signal Classification," School of Computing Science, Simon Fraser University, Burnaby, BC, Canada, Feb. 23, 2000, pp. 1-46.
Gong et al., "An Image Database System with Content Capturing and Fast Image Indexing Abilities," School of Electrical and Electronic Engineering, Nanyang Technological University, Singapore, 1994 IEEE, pp. 121-130.
Gudivada et al., "Content-Based Image Retrieval Systems," Ohio University, Ohio, USA, 1995 IEEE, pp. 18-22.
Gunsel et al., "Similarity Analysis for Shape Retrieval by Example," Dept. of Electrical Engineering and Center for Electronic Imaging Systems, University of Rochester, Rochester, NY, USA, 1015-4651/96 1996 IEEE, Proceedings of ICPR '96, pp. 330-334.
Jansen et al., "Searching for multimedia: analysis of audio, video and image Web queries," Computer Science Program, University of Maryland (Asian Division), Seoul, Korea, World Wide Web 3: 249-254, 2000, pp. 249-254.
Konstantinou et al., "A Dynamic Java-Based Intelligent Interface for Online image Database Searches," School of Computer Science, University of Westminster, London, U.K., Dionysius P. Huijsmans, Arnold W.M. Smeuldeis (Eds.): Visual '99, LNCS 1614, 1999, pp. 211-220.
Kroepelien et al., "Image Databases: A Case Study in Norwegian Silver Authentication," Dept. of Cultural Studies and Art History, University of Bergen, Bergen, Norway, 1996 IEEE, Proceedings of ECPR '96, pp. 370-374.
Lee et al., "Indexing or Complex Queries on a Query-By-Content Image Database," IBM Almaden Research Center, San Jose, CA, USA, 1051-4651/94, 1994 IEEE, pp. 142-146.
Lee et al., "Reliable On-Line Human Signature Verification System for Point-of-Sales Applications," Faculdade de Engenharia Eletrica, Universidade Estadual de Campinas, Campinas, Brazil, 1051-4651/94,1994 IEEE, pp. 19-23.
Li et al. "Content-Based Audio Classification and Retrieval Using the Nearest Feature Line Method," Microsoft Research China. pp. 1-12. Last Accessed, Nov. 11, 2013.
Li et al., "C-Bird: Content-Based Image Retrieval from Digital Libraries Using Illumination Invariance and Recognition Kernel," School of Computing Science, Simon Fraser University, Burnaby, B.C., Canada, pp. 1-6. Last Accessed, Nov. 11, 2013.
Li et al., "Illumination Invariance and Object Model in Content-Based Image and Video Retrieval," School of Computing Science, Simon Fraser University, Burnaby, B.C., Canada, Journal of Visual Communications and Image Representation 10, (1999), pp. 219-244.
Lienhart et al., "Video Abstracting," University of Mannheim, Mannheim, Germany, Communications of ACM, pp. xx-yy, Dec. 1997, pp. 1-12.
Lienhart et al., "VisualGREP: A Systematic Method to Compare and Retrieve Video Sequences," Universitat Mannheim, Germany, Accepted for publication in Kluwer Multimedia Tools and Applications, 1998, pp. 1-21.
Liu et al., "An Approximate String Matching Algorithm for Content-Based Music Data Retrieval," Department of Computer Science, National Tsing Hua University, Taiwan, R.O.C., pp. 1-6. Last Accessed, Nov. 11, 2013.
Liu et al., "Audio Feature Extraction and Analysis for Scene Segmentation and Classification," Polytechnic University, Brooklyn, NY, USA, pp. 1-39. Last Accessed, Nov. 11, 2013.
Loscos et al., "Low-Delay Singing Voice Alignment to Text," Audiovisual Institute, Pompeu Fabra University, Barcelona, Spain, Published in the Proceedings of the ICMC99, pp. 1-5.
Ma et al., "NeTra: A toolbox far navigating large image databases," Hewlett-Packard Laboratories, Palo, Alto, CA, USA, Multimedia Systems 7: (1999), pp. 184-198.
Mel et al., "SEEMORE: A View-Based Approach to 3-D Object Recognition Using Multiple Visual Cues," Department of Biomedical Engineering, University of Southern California, Los Angeles, CA, USA, 1015-4651/96 1996 IEEE, Proceedings of ICPR '96, pp. 570-574.
Melih et al., "An audio representation for content based retrieval," Griffith University, IEEE Region 10 Annual International Conference, Proceedings: Speech and Image Technologies for computing and Telecommunications, 1997, pp. 207-210.
Mohan et al., "Using Perceptual Organization to Extract 3-D Structures," IEEE Transactions on Pattern Analysis and Machine Intelligence, vol. II, No. 11, Nov. 1989, pp. 1121-1139.

(56) References Cited

OTHER PUBLICATIONS

Nam et al., "Dynamic Video Summarization and Visualization," Department of Electrical and Computer Engineering, University of Minnesota at Twin Cities, Minneapolis, MN, USA, ACM Multimedia '99 (Part 2) 10/99; Orlando, FL, USA, pp. 53-56.

Niblack et al., "The QBIC Project: Querying Images by Content Using Color, Texture, and Shape," IBM Research Divison, Almaden Research Center, San Jose, CA, USA, SPIE vol. 1908 (1993), pp. 173-187.

Ogle et al., "Chabot: Retrieval from a Relational Database of Images," University of California at Berkeley, Berkeley, CA, USA, pp. 1-18. Last Accessed, Nov. 11, 2013.

Ortega et al., "Supporting Ranked Boolean Similarity Queries in MARS," IEEE, Issue 6, Nov./Dec. 1998, pp. 1-13.

Ortega et al., "Supporting Similarity Queries in MARS," Department of Computer Science and Beckman Institute, University of Illinois at Urbana-Champaign, Urbana, IL, USA, pp. 1-11. Last Accessed, Nov. 11, 2013.

International Searching Authority, "Search Report and Written Opinion," issued in connection with International Application No. PCT/US13/20695, mailed on Mar. 26, 2013, 7 pages.

\* cited by examiner

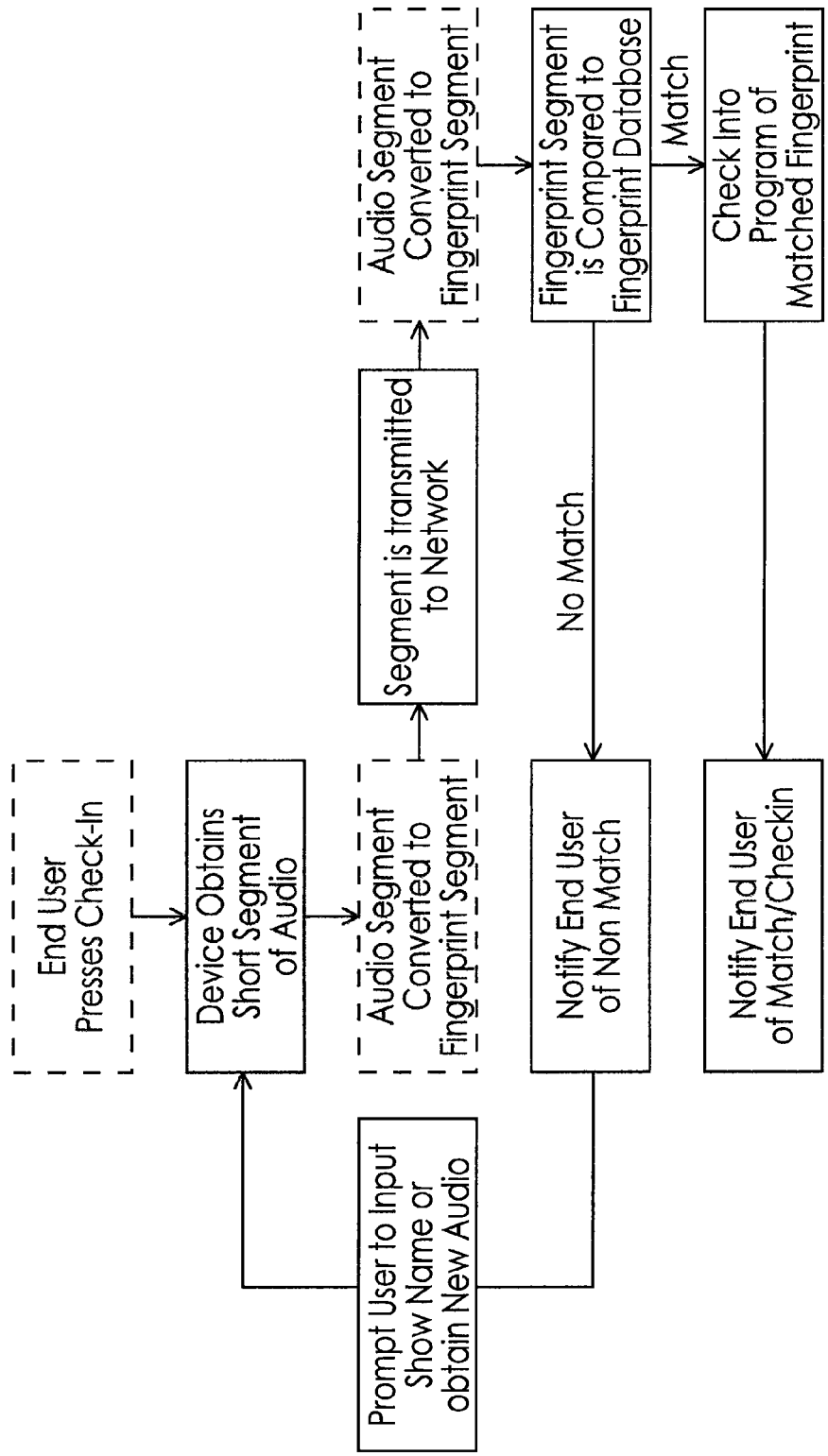

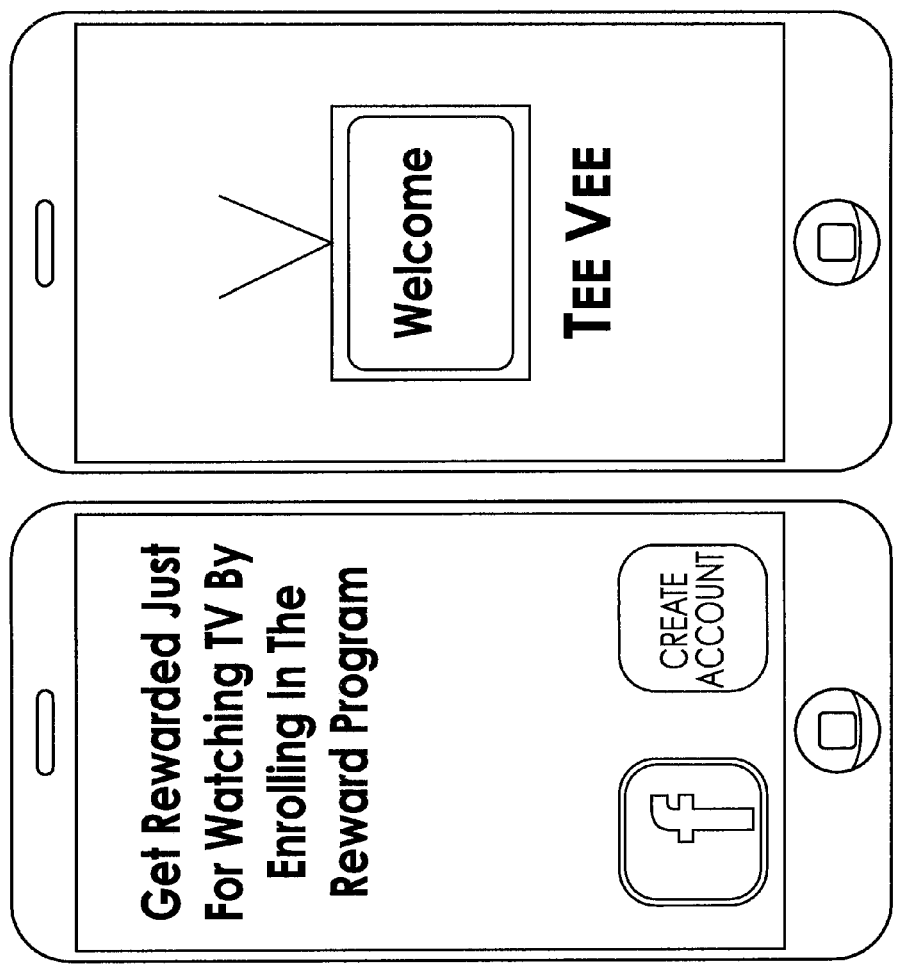

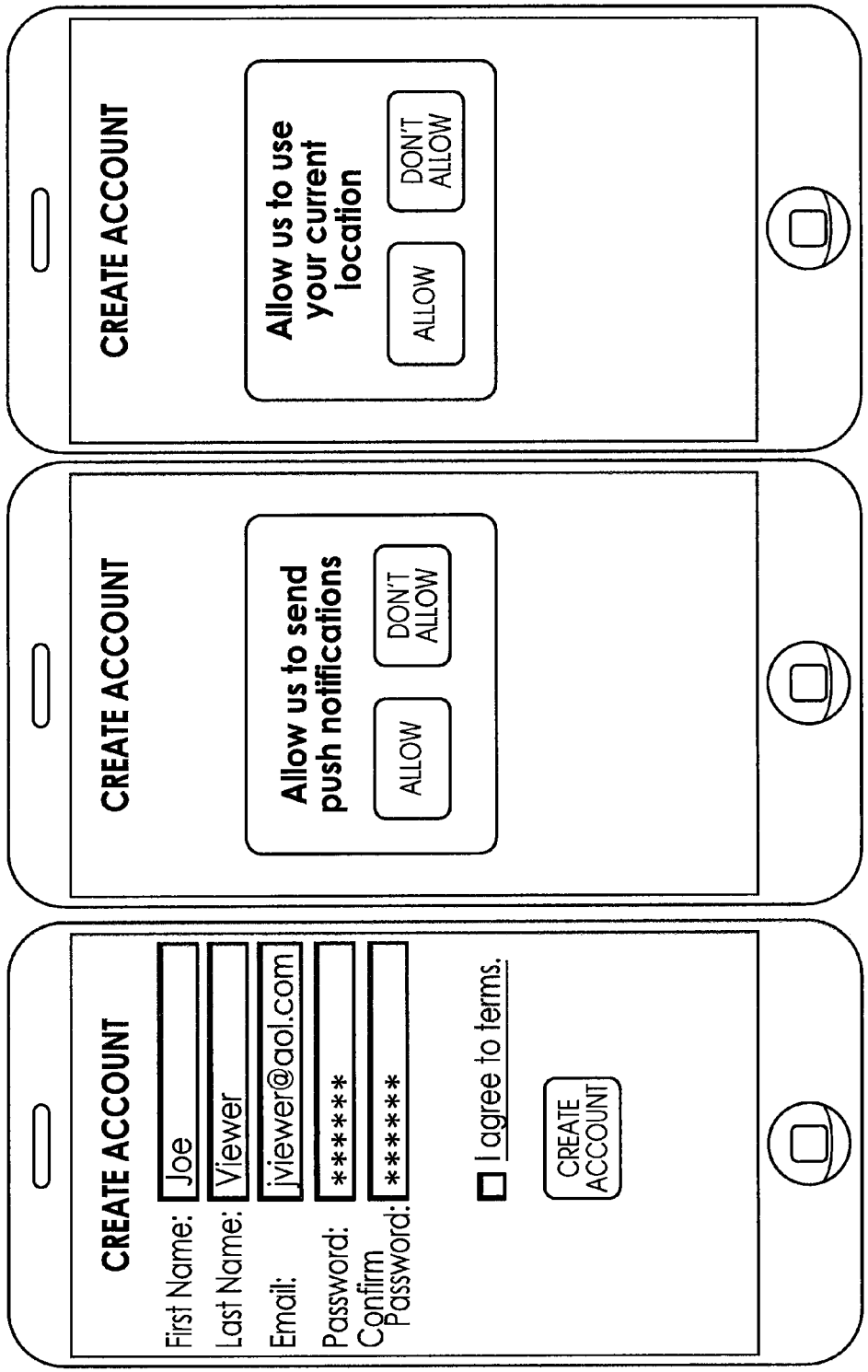

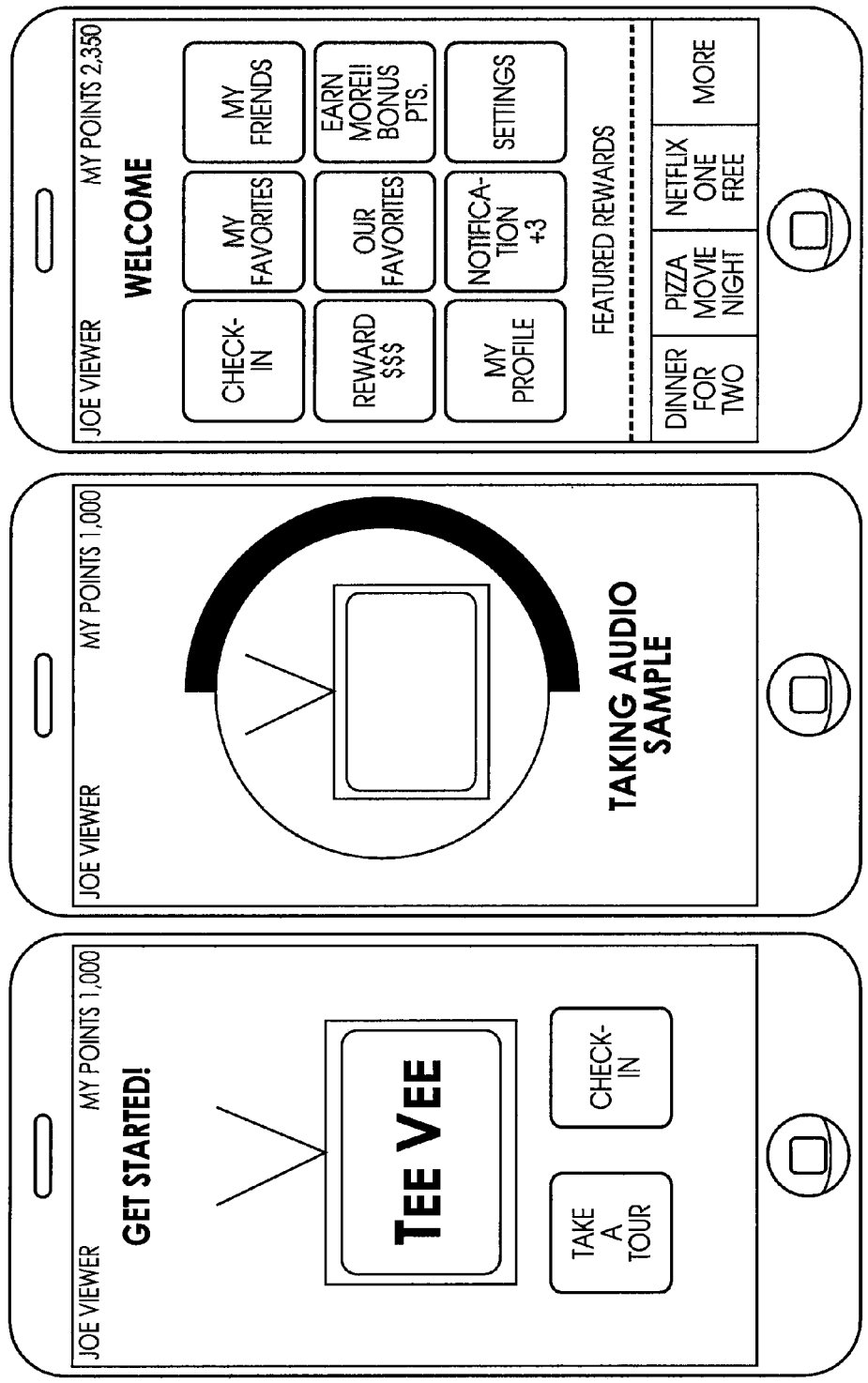

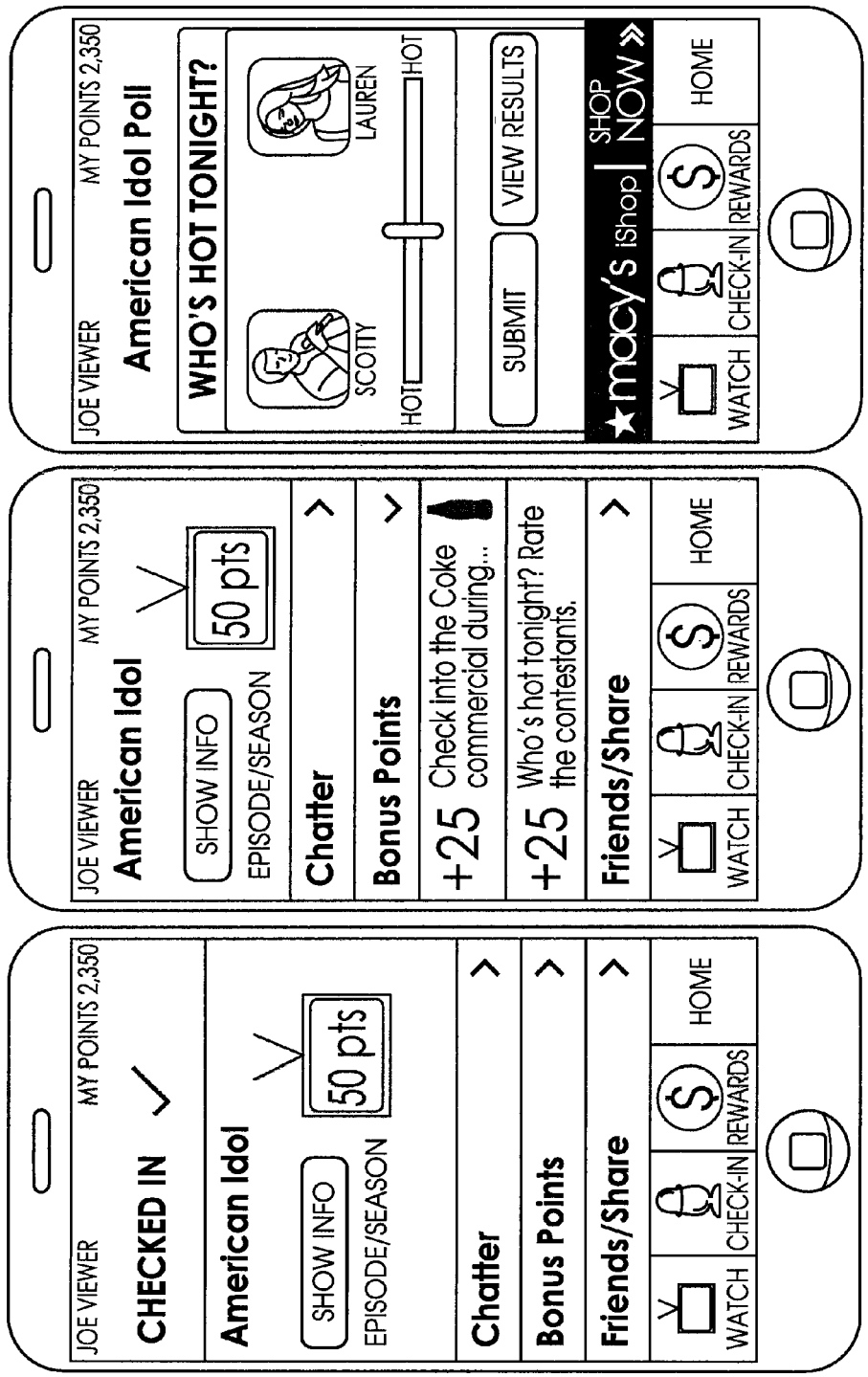

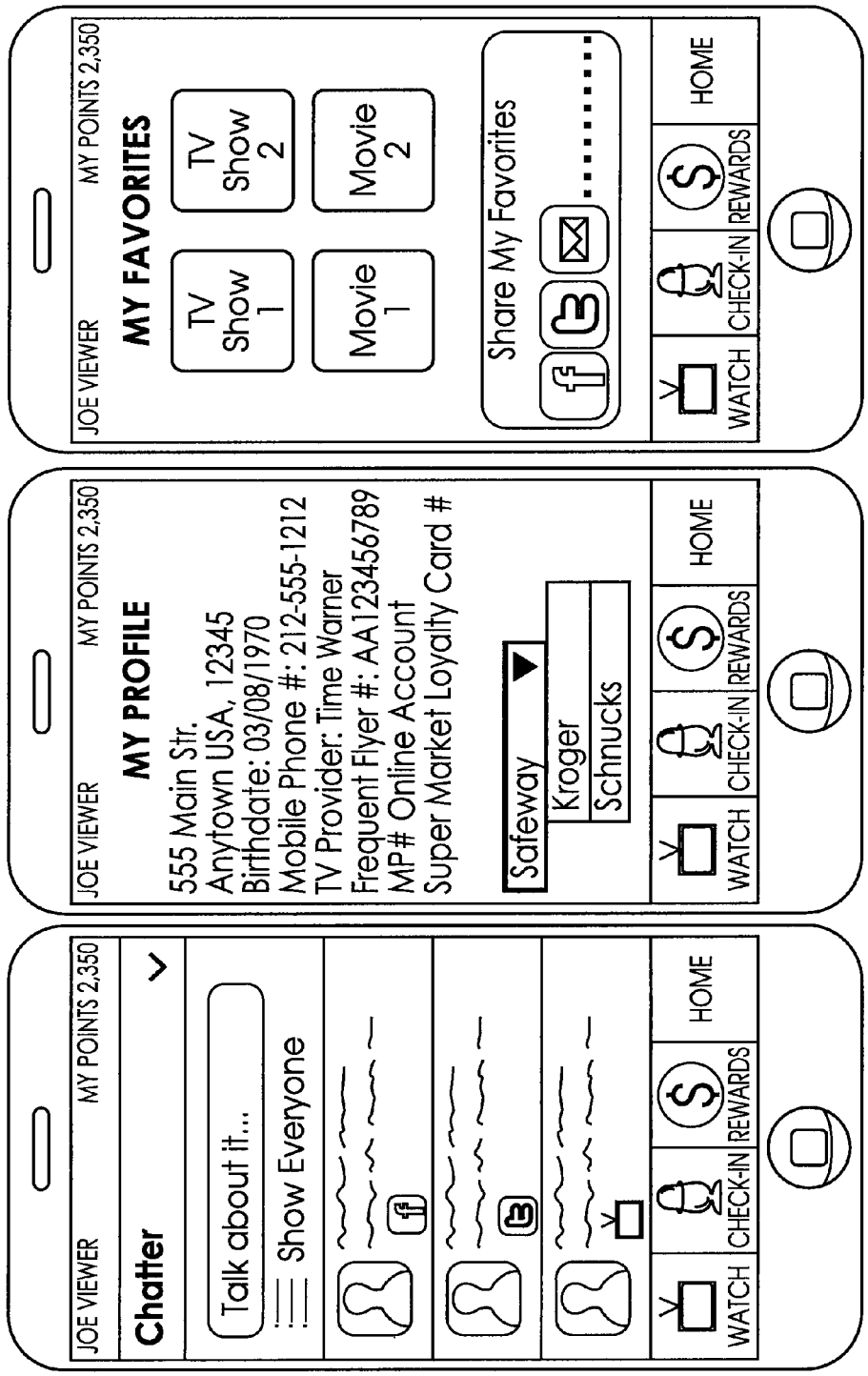

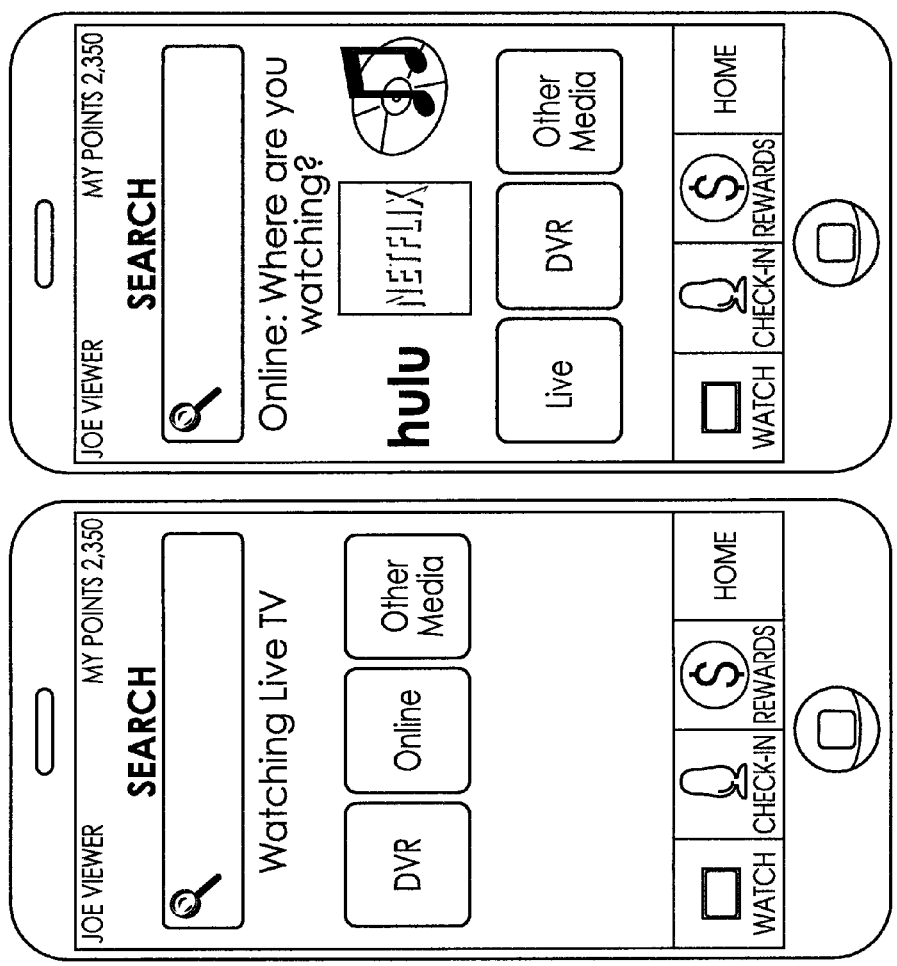

FIG 15C

JOE VIEWER          MY POINTS 2,350

Redeem Rewards

Reward: $10 iTunes gift card via U.S. mail iTunes of points: 100 points
Description:

[REDEEM]

Have you considered a $10 iTunes electronic gift card delivered to your itunes account for only 90 points?

FIG 15D

JOE VIEWER          MY POINTS 2,350

Redeem Rewards

Reward: 1 Entry in Glee walk-on sweepstakes
of points: 10 points per entry
Description:

Remaining Time: 5 days, 23 hrs, 10 min
Current Entries: 10,112
Only ONE entry will win.

You have ∅ entries, how many entries would you like? [ ]

[REDEEM]

FIG 15E

JOE VIEWER          MY POINTS 2,350

Online Auction

A 32" HDTV by .....

Opening Bid: 10,000 points
Current Bid: 15,000 points
Your Previous Bid: none
Remaining Time: 3 days, 12 hrs, 35 min Bid: [          ]  [ENTER]

SYSTEM AND METHOD FOR TRACKING AND REWARDING MEDIA AND ENTERTAINMENT USAGE INCLUDING SUBSTANTIALLY REAL TIME REWARDS

This application claims priority to U.S. Provisional Patent Application No. 61/509,021, filed on Jul. 18, 2011 and entitled "System and Method for Tracking and Rewarding Media and Entertainment Usage Including Substantially Real Time Rewards." This application is incorporated herein by reference in its entirety.

BACKGROUND

1. Field of the Invention

The present invention relates to systems and methods for rewarding entertainment consumers, and more specifically to a system and method for rewarding people for watching or otherwise engaging in various forms of media and entertainment (e.g. broadcast TV, on-demand TV, games, live entertainment, movies, and radio) to promote loyalty to or improve recognition of all entertainment, while collecting useful data about the media consumption habits as well as the rewards consumption patterns associated with those consumers.

2. Description of the Related Art

Over the past two decades there has been huge growth in the number of in-home entertainment options. Much of this growth has been driven by cable and satellite television, which not only provides more broadcast channel options than traditional over-the-air broadcast television could provide, but also provides the ability to view programming on demand. This on demand programming includes some of the same content (e.g. movies, sporting events, news, talk shows, dramatic series, comedy series, documentaries, family programming, educational programming, and reality programming). While some of this content is pay-per-view, much of the content is still supported by the sale of commercial advertising interspersed during the content.

Over the past decade there has also been significant growth in various in-home entertainment options, including but not limited to broadcast TV, on-demand programming, gaming (particularly online games), online video and radio. Taking radio as an example, over the past few years the addition of paid satellite radio programming, new technologies, such as HD radio, have expanded the offerings that can be made available well beyond the stations that could be provided on AM and FM radio.

As a result of this proliferation of entertainment choices, there is a desire in the media and entertainment industry to attract viewers/listeners, which may also be referred to herein as media and entertainment consumers or just consumers, to consume (i.e. listen and/or watch) content. There is an associated desire in the media and entertainment industry to retain viewers.

Notwithstanding the proliferation of media and entertainment options there is still a limit to the amount of content and commercial advertising that can be provided. Consequently, content providers have been looking for additional outlets to connect to their viewers. Among other things, content providers have been trying various means to use the Internet and other social media, such as Facebook® and Twitter®. Most of these means have involved connecting the viewers with one another to discuss programming and other media-related interests via social networks and destination websites where the viewers may consume additional content and be exposed to additional advertising.

However, these traditional media attempts at Internet and social media offerings have required too much effort for viewers to access. Moreover, these attempts have not been sufficiently interactive to attract users in a systematic way. Consequently, there is a need for a system and method that will engage viewers and encourage them to interact with additional outlets in association with their media and entertainment viewing interests.

Reward or loyalty programs are ubiquitous. Generally these programs seek to reward certain buying behaviors that benefit a company. One common example of a loyalty program is that of airline frequent flyer programs. These frequent flyer programs began by providing points for every mile flown on a particular airline with a predetermined number of points redeemable for free airline tickets (e.g. 50,000 points or miles) or for upgraded service (e.g. 10,000 points to upgrade from Economy to First Class). As these frequent flyer programs evolved point awards were enhanced by a variety of factors, including providing premium points based on premium ticket pricing and based on how many annual miles the flyer flies (e.g. two points for every mile flown if the flyer flew in excess of 50,000 miles in the previous year). There was also an evolution in the redemption opportunities to include the ability to exchange points for airport club memberships and even physical goods. Many credit card companies and hotel chains have established programs that are remarkably similar to the airline frequent flyer example.

Another common example are retail loyalty programs. Many of these programs provide a discount based on the presentation at the point of sale of a loyalty card or the input of unique information associated with the user's account, such as the user's telephone number.

In all instances, loyalty program sponsors gather at least a minimal amount of data (e.g. telephone number and/or zip code) directly from the user and then collect other data regarding the user's purchasing/traveling patterns through their continued use of their loyalty account. For instance, a grocer may use information from the frequent purchase of flowers to provide coupon offers. An airline may provide an email to a particular frequent flyer regarding reduced fares to vacation destinations that the consumer has previously flown to. A credit card loyalty program may provide reduced rate concert or sporting event tickets for certain card users to reward their level of card usage.

Loyalty programs have not been successfully deployed in association with media and entertainment content. There is a need to integrate features of a variety of loyalty programs into a meaningful interaction with viewers, media and entertainment providers, and content owners. There is an associated need to develop new loyalty programs that are specific to the media opportunity.

Media and entertainment providers and their advertising customers have long had data that purports to provide demographic and quantitative information regarding the consumers of media and entertainment. For instance, advertisers may be interested in knowing which television shows attract 20-35 year female viewers or which radio programs attract the most teenage boys. Various companies have developed over the decades that provide this type of data based on their relationships with a "random sample" of the viewing public. There is a need to improve the collection, variety, and granularity of data available to media and entertainment providers, content providers and advertisers. There is also an associated desire to have greater sample sizes and variety.

Over the last few years, the adoption of smart phones has accelerated particularly within highly desirable demographics for media and entertainment providers, content providers, and advertisers. Smart phones provide cellular telephone audio, SMS messaging, MMS messaging, data services, and sufficient processor power to run computer applications. There are many smart phone manufacturers who design smart phones and other devices for use with a variety of complex operating systems including, but not limited to, Android, Blackberry OS, iOS, Windows Mobile 7, and WebOS. Because smart phones are used regularly in daily life they provide an opportunity for advertisers and marketers. This opportunity, however, has been under-utilized, particularly to harness viewers for media content providers.

SUMMARY OF DISCLOSURE

The present disclosure teaches various inventions that address, in part (or in whole) these and other various desires in the art. Those of ordinary skill in the art to which the inventions pertain, having the present disclosure before them will also come to realize that the inventions disclosed herein may address needs not explicitly identified in the present application. Those skilled in the art may also recognize that the principles disclosed may be applied to a wide variety of techniques involving communications, marketing, reward systems, and social networking.

The present invention provides a new and innovative system and associated methods for rewarding individual viewers of television, games, music, radio, movies, live events and other forms of broadcast or recorded entertainment in a manner that would promote loyalty to and/or improve recognition of certain content, while providing information and marketing opportunities to the entire audience or at an individualized level for content providers and advertisers. The present invention also preferably includes a social component and game features that could be added for those users who might be interested in a richer experience.

At its most basic level, consumers initially download a simple free application to their mobile phone, tablet, or laptop, consumers place their app-enabled mobile phone (or any other device) in front of them while watching television or otherwise receiving media content; the app captures real-time data about the media content (e.g. audio) by responding to a user-interface prompt; the captured programming data is analyzed and matched via a network of servers; and feedback is provided to the consumer based on the captured audio. Preferably, the consumer will be awarded points for just performing this downloading step. The consumers may additionally (or alternatively) engage with the system using their personal computer and/or tablet computer if they are interested in having more robust interactions with the system.

To encourage further use and deeper interactions, the viewers are provided incentives, such as loyalty points. At its most basic, the system preferably provides recognition to even the most passive users by providing incentives for checking into the system and watching television with the system activated. Among the incentives there will be different tiers of user status (i.e. Fan to Super Fan) and loyalty points. The loyalty points will be used to increase and maintain interactions between consumers and content/media providers, including, but not limited to engaging viewers with commercials on television, involving them in polling exercises, and exposing them to additional adjunct content. For instance, the viewer could get more points in selected instances for watching a television show for N consecutive weeks; by reacting to content of the show and associated advertisements; by allowing others to share what they are watching (in real-time as well as historically); and by chatting with other users watching the same content in real-time as well as in a post-show, virtual "watercooler" mode. In this way, the system provides a tool for media and entertainment networks to attempt to effect viewing behavior changes through a system of tiered rewards of their choosing.

Other macro and micro loops that prompt further user interaction are context sensitive and preferably use analytics to automatically cluster users based on attributes (e.g. user, behavior, show preferences). For instance, the system may remind viewers of upcoming shows, provide trends, and provide information about friends' viewing habits and preferences. These loops should allow the system to offer more relevant rewards to each user segment. It is also contemplated that the viewers would get additional loyalty points for referring additional users; reviewing a newsletter; providing additional user profile information (e.g. email address, Facebook account, Twitter account, mobile phone number, third party loyalty card numbers); opting-in for SMS text messaging; participating in a user survey; logging onto the system via Facebook and/or Twitter; and participating in social networking discussions about the content and/or the process. To facilitate this functionality, the system would preferably pull comments in from Facebook and Twitter and then allow viewer 40 to comment on the posts and tweets that have been pulled in.

The loyalty points will be easy to redeem across multiple digital platforms, including via mobile devices. There will be three primary types of incentives with options (but not so many as to cloud the redemption process):

(1) cash equivalents (e.g. send restaurant/retailers/grocery gift card, pay a portion of the cable bill, pay a portion of mobile phone bill, or donation to charity);

(2) tangible prizes selected directly from an on-line catalog, won in an on-line auction, or won as part of a sweepstakes; and (3) entertainment relevant incentives (e.g. drawn into a Simpson's episode, exclusive American Idol content).

Data regarding each user's point redemption activities may be utilized to capture user preferences, including but not limited to, brand preferences. For example, a user redeeming points for a Coca Cola T-shirt may indicate a preference for Coke. Similarly, redemption for a 4-pack of razor blades may indicate a desire for a particular product as approved by others.

The system and associated methods will provide various revenue generation opportunities including, by way of example, media and sponsorship sales, charter marketing partnerships, direct marketing and promotional offers, aggregated sales data, point sales, affiliate revenues associated with reward redemption and strategic partner revenues. In particular, the system and associated methods provide the ability to conduct push marketing via the computer applications deployed on computers and smart phones as well as via email, and SMS. That push marketing may be narrowly tailored based on information collected by the system regarding the demographics and content interests of the viewers.

In another example, the ability to shift and/or increase viewer loyalty provides monetary value to media and entertainment network content providers and their advertisers. For instance, the system could push a message to a viewer presently watching a show on FOX that markets a similar show for ABC. In another example, the system may allow FOX to maintain more of their audience throughout the season (whereas shows have traditionally lost audience shares as the season moves on). As would be understood by those of ordinary skill in the art having the present specification, drawings, and claims before them, these examples (and other similarly related examples) would apply similarly to games, live entertainment, and on-demand or pay-per-view programming, among other potential forms of entertainment.

Raw data analytics provide an additional potential revenue source. Just touching the surface of the data, the system may allow determination of the best commercials, the most watched shows, and the most discussed shows. In combination with secure, private collection of data from the viewers, a nearly endless variety of analytics may be conducted. For instance, the demographic, content viewing and reward selection data may combine to tell the owner of certain content that their 20-30 year old viewers are interested in pay-per-view concerts, a new weekly show or an upcoming studio-release movie. In another example, the data could show a correlation between viewers who redeemed points for razor blades and viewership of hockey.

The analytic engine may skim the data to provide the ability to advertisers to provide for self-serve ad buying capabilities. In other words, a razor manufacturer could choose to send razor ads to the mobile phones of 18-22 year old males who recently watched a show containing a scene where an actor used their razor.

These and other advantages and uses of the present system and associated methods will become clear to those of ordinary skill in the art after reviewing the present specification, drawings, and claims.

BRIEF DESCRIPTION OF THE FIGURES

FIG. 5A illustrates a flow diagram of a method of audio check-in verification that may be used in association with one embodiment of the system illustrated in FIG. 1.

FIG. 6 illustrates one potential user interface approach to an introduction screen that may be used in association with one example of an application that may be downloaded onto a smart phone (or other portable device) with the understanding that the smart phone and graphical user interface illustrated in the figures is merely intended to provide an example of one potential deployment of the application without limiting the invention to that particular type of smart phone, operating system, or graphical user interface.

FIG. 6A illustrates one user interface approach to a "welcome" screen in the installed application that would preferably be used in association with the computer application deployed on the exemplary smart phone of FIG. 6.

FIGS. 7, 7A and 7B collectively illustrates one user interface approach to a simplified "create account" screen in the installed application that would preferably be used in association with the computer application deployed on the exemplary smart phone of FIG. 6.

FIG. 8 illustrates one potential user interface approach to a "get started" screen in the installed application that may be used in association with the exemplary smart phone of FIG. 6.

FIG. 8A illustrates one user interface approach to a "an audio check in" screen in the installed application that would preferably be used in association with the computer application deployed on the exemplary smart phone of FIG. 6.

FIG. 9 illustrates one user interface approach to a "home screen" in the installed application that may be used in association with the exemplary smart phone of FIG. 6.

FIG. 11A illustrates one user interface approach to a "checked in" screen in the installed application that may be used in association with the exemplary smart phone of FIG. 6.

FIG. 11B illustrates the user interface of FIG. 11A with the "bonus points" section expanded.

FIG. 11C illustrates the user interface when a viewer selects the "Who's hot tonight?" bonus point option of FIG. 11B.

FIG. 11D illustrates the user interface of FIG. 11A with the "chatter" section expanded with the title portion hiding above the visible screen and the bonus points and friends/share portions hiding below the visible screen.

FIG. 12 illustrates one user interface approach to a personal profile screen that may be used in the installed application on the exemplary smart phone of FIG. 6.

FIG. 13 illustrates one user interface approach to a "favorites" screen that may be used in the installed application in the exemplary smart phone of FIG. 6.

FIGS. 14A and 14B illustrate one user interface approach to searching for content on live and online television, respectively, that may be used in the installed application on the exemplary smart phone of FIG. 6.

FIGS. 15A, 15B, 15C, 15D and 15E together illustrate one user interface approach to rewards redemption that may be used in association with one example of the installed application as it may be deployed on the exemplary smart phone of FIG. 6, while illustrating the types of rewards that may be provided in association with one or more embodiments of the present invention.

DETAILED DESCRIPTION

The present invention provides a system and method that can be utilized with a variety of different client devices, including but not limited to desktop computers and mobile devices such as PDA's, smart phones, cellular phones, tablet computers, and laptops, to reward consumers of media and entertainment (also called "viewers") in a manner that should promote loyalty to and/or improve recognition of certain shows, while further providing information and marketing opportunities. Thus, while the invention may be embodied in many different forms, the drawings and discussion are presented with the understanding that the present disclosure is an exemplification of the principles of the inventions disclosed herein and is not intended to limit any one of the disclosed inventions to the embodiments illustrated.

Figure 1:
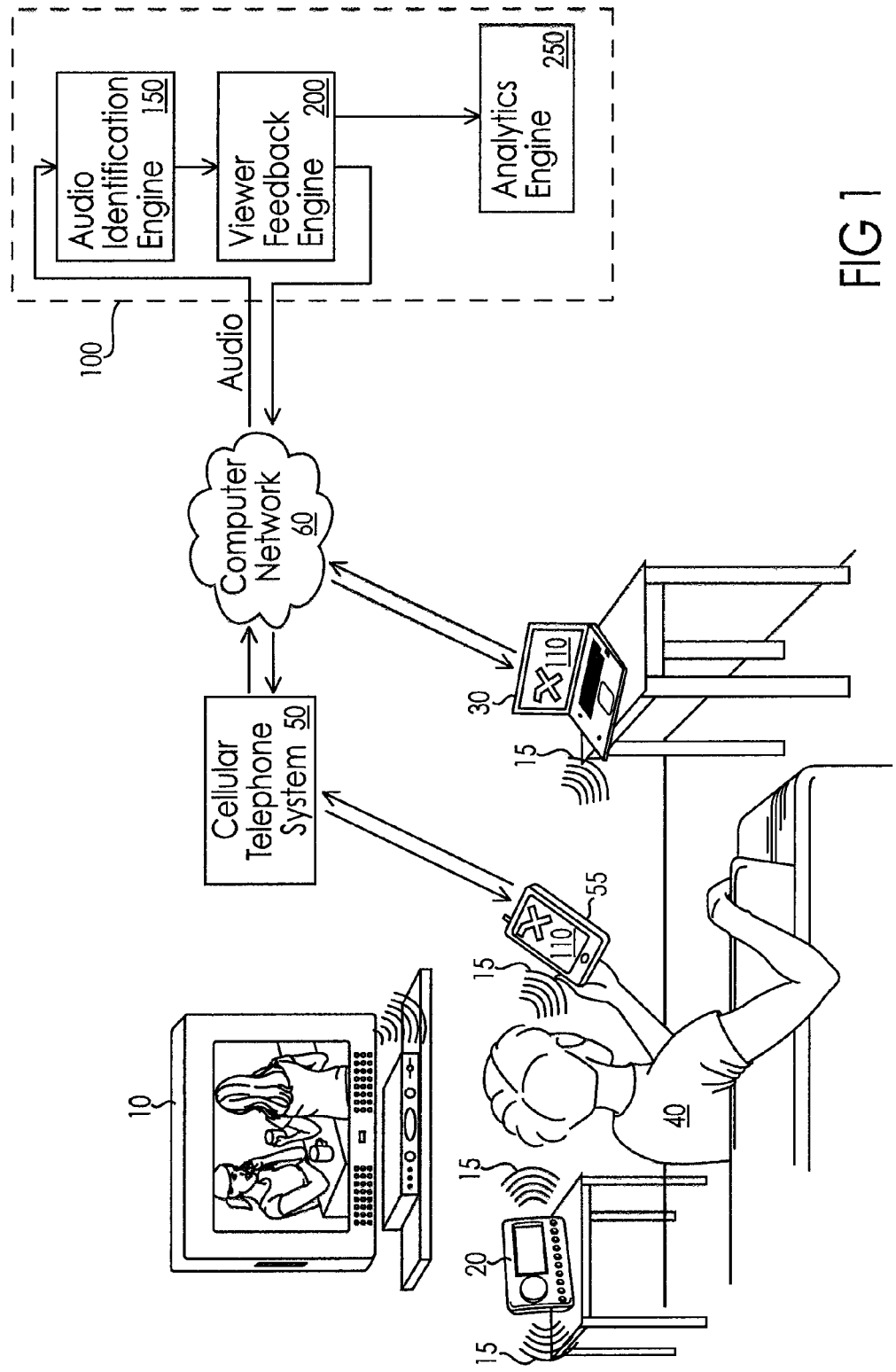
FIG. 1 illustrates one embodiment of a system in accordance with one approach to the present invention.

FIG. 1 illustrates one embodiment of a system 100 and its potential avenues for interaction with the real world toward implementing the concepts of the present invention. In particular, system 100 communicates with viewer 40 via a computer application 110 that has been installed on the smart phone 55 in viewer's hand. System 100 may also communicate with viewer 40 via SMS, MMS, push notification, and other types of messaging (not shown) that are or may become available on smart phone 55. Although the specification will continue to speak in terms of smart phone 55, it should be understood by those of ordinary skill in the art having the present specification, drawings, and claims before them that in some approaches to the present invention it would be possible to utilize any telephone or even computer that can capture audio for transmission into system 100.

The smart phone 55 is connected to the system 100 via a cellular telephone system 50 and computer network 60. The cellular telephone system 50 may be any type of system, including, but not limited to CDMA, GSM, TDMA, 3G, 4G, and LTE. To facilitate the use and bi-directional transmission of data between the system 100 and smart phone 55, the cellular telephone system 50 is preferably operably connected to computer network 60 in a variety of manners that would be known to those of ordinary skill in the art.

System 100 may further communicate with viewer 40 via computer 30 that is operably connected to the system 100 via the computer network 60. The computer network 60 used in association with the present system may comprise the Internet, WAN, LAN, Wi-Fi, or other computer network (now known or invented in the future). It should be understood by those of ordinary skill in the art having the present specification, drawings, and claims before them that the computer network 60 may be operably connected to the computer 30 over any combination of wired and wireless conduits, including copper, fiber optic, microwaves, and other forms of radio frequency, electrical and/or optical communication techniques.

As shown in FIG. 1, a fundamental concept is that some device, such as smart phone 55 is exposed to the ambient audio 15 that viewer 40 is currently experiencing. For instance, FIG. 1 depicts the viewer 40 listening to a television 10 and a radio 20. The television 10 may be broadcasting live television programming that was delivered to the television 10 from various sources, such as cable set top box or satellite receiver 11, DVD or BluRay disks (not shown), or from a digital video recorder (DVR), which may be incorporated into set top box/receiver 11. The radio 20 may be broadcasting AM, FM, HD radio and/or satellite radio programming into the living room of viewer 40. As illustrated in FIG. 5A, when the computer application 110 (previously installed on smart phone 55) is activated, it will capture a moment of the ambient audio 15. Alternatively, the application 110 may be continuously running, but only obtain an audio segment after the viewer 40 presses a "Check-In" button (see, e.g., FIG. 8 or 9). The captured audio segment may be converted into an audio fingerprint on the smart phone 55 and then transmitted to the system 100 via cellular telephone system 50 and computer network 60 or it may be converted into an audio fingerprint after the audio segment has been transmitted to the system 100. FIG. 8A depicts a potential user interface that may appear while the system is obtaining and checking the audio sample (i.e. the process depicted in FIG. 5A). If the fingerprint segment of the audio sample is successfully matched to a fingerprint in the fingerprint database 155, then the viewer is notified of the successful check-in. If the fingerprint segment of the audio sample is not successfully matched to a fingerprint in the fingerprint database 155, then the viewer is notified of the non-match. If there was a non-match, the viewer may be given an opportunity to try matching again (by obtaining a new short audio segment) or by inputting the name of the program automatically or finding the show via a "SEARCH" button (causing the interfaces illustrated in FIGS. 14A and 14B to appear on the screen), thus providing a textual search of the content programming listings.

Returning to FIG. 1, computer 30 may be any type of computer, such as desktop, laptop, or tablet computer that can preferably operably connect to the computer network 60. Computer 30 should include a video display and a browser capable of rendering content from social media sites such as Facebook® to enhance the viewer experience in interacting with the system 100. Computer 30 may also have the computer application 110 installed thereon. The computer application 110 installed on the computer 30 may be a different or the same application that is installed on smart phone 55. It is possible for computer application 110 to have a slightly different look and feel on computer 30 than on smart phone 55 because of the additional screen space, however, it is preferred that the look and feel be sufficiently similar to invoke the same feeling in the viewer with respect to the interaction with the system 100. As such, computer application 110 on the computer 30 could also be used to check into shows in the manner described with respect to FIG. 5A above.

Figure 4:
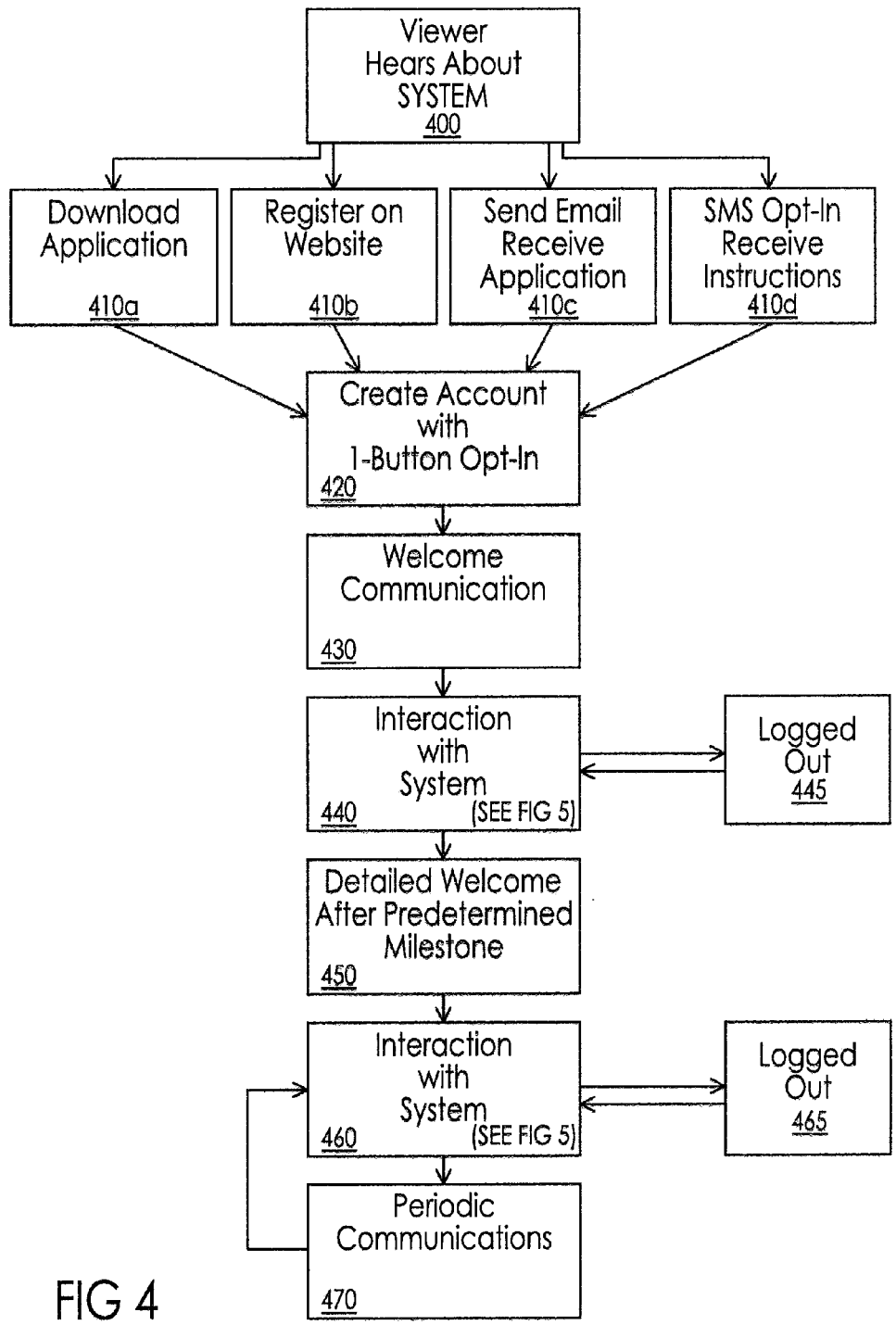
FIG. 4 illustrates a flow diagram of one approach to the overall interaction between viewers and the system associated with one potential aspect of the present invention.

System 100 includes the computer application 110, an audio identification engine 150, a viewer feedback engine 200, and an analytics engine 250. Computer application 110 may be pre-installed on computer 30 and/or smart phone 55. However, as depicted in FIG. 4, after viewers learn about system 100 (box 400), it is primarily contemplated that the viewer 40 may download the computer application 110 (box 410*a*) from one of a variety of sources including, but not limited to the iTunes® AppStore, Android® application marketplace or a dedicated website. It is alternatively contemplated that the viewer 40 may send an email to a dedicated website and receive, in return, a copy of the computer application 110 for installation (box 410*c*). It is also contemplated that the viewer 40 may send a predetermined SMS message to an enumerated short code (e.g. Send JOIN to 55512) and receive instructions for interacting with system 100 via a return SMS message (box 410*d*). Finally, it may be possible for viewer 40 to register on the website without downloading the computer application 110 (box 410*b*). In such a case the application 110 may be invoked from the website (or otherwise in the cloud).

Computer application 110 will be explained in further detail with respect to the flow diagrams of FIGS. 4, 5, 5A, and 5B as well as representative smart phone screen shots depicted in FIGS. 6 through 16. For now, it should be understood that computer application 110 will be used to capture a segment of ambient audio 15 for use in the remainder of system 100.

Although the various aspects of system 100, such as audio identification engine 150, a viewer feedback engine 200, and an analytics engine 250 have been illustrated as being singular and co-located with one another to avoid obscuring the invention, as should be understood by those of ordinary skill in the art having the present specification, drawings, and claims before them it is contemplated that the various aspects of system 100 may be deployed across the globe in the cloud or on a plurality of servers, which may provide redundant functionality to allow quicker—substantially real-time—processing of the ambient audio 15 that is being captured by computer application 110. In fact, it should also be understood that certain aspects of the audio identification engine 150 could even be deployed onto the smart phone 55 and/or computer 30 of each viewer 40.

The audio identification engine 150 takes the captured audio segment and converts it from audio to audio fingerprint. Then, audio identification engine 150 compares the resulting audio fingerprint with audio fingerprints stored in database 155 to determine whether the audio segment received from the viewer 40 is known. It is contemplated that the conversion from audio to audio fingerprint (and any intermediate stages in between) may be performed local to the viewer or within audio identification engine 150.

Figure 2:
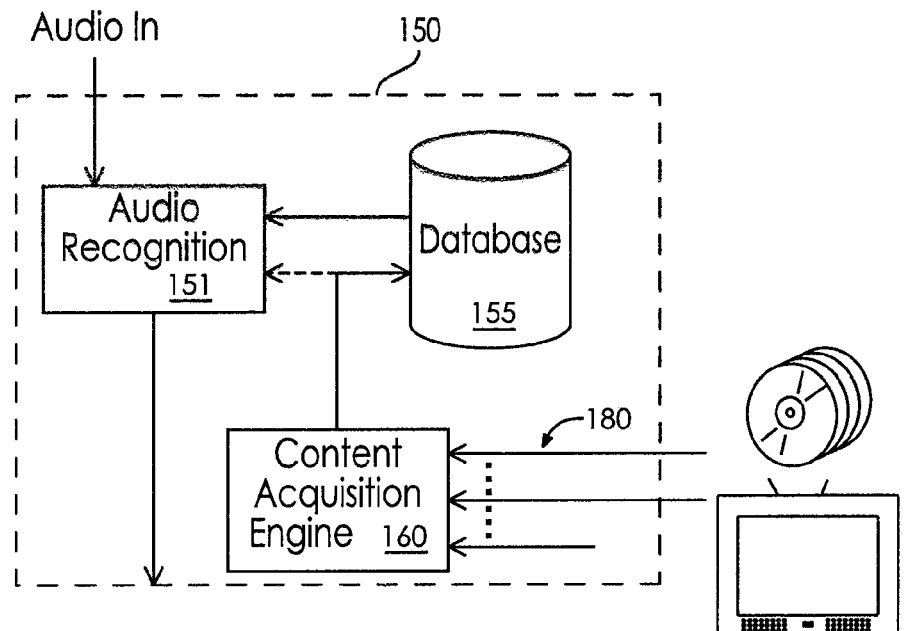
FIG. 2 illustrates some of the details associated with the audio identification engine of the system illustrated in FIG. 1.

The audio fingerprints of the media and entertainment content is stored in database 155 (along with textual data regarding the fingerprint, including but not limited to show title) following processing of the media and entertainment content by content acquisition engine 160. However, as also shown in FIG. 2, the media and entertainment audio fingerprints may be provided directly from content acquisition engine 160 directly to audio recognition engine 151. This use case would primarily occur where the media and entertainment content was live content, however, it need not be so limited. In particular, the content acquisition engine 160 may capture the entire range of audio, some sub-range(s) of the audio spectrum, read preexisting audio fingerprints within the audio, and/or create fingerprint representations of the media and entertainment content 180 for use in comparing the audio fingerprints received from the various viewers in audio recognition engine 151 and/or storage in database 155.

Various forms of audio recognition can be used in the audio recognition engine 151, including everything from full blown speech recognition to audio fingerprinting using selected frequencies within the audio range. Likewise, various speech recognition and audio fingerprinting techniques may be used to create a digital representation of the audio that has been captured in associated with the media and entertainment content currently being experienced by viewer 40. As would be understood by those of ordinary skill in the art having the present specification, drawings, and claims before them audio identification engine 150 will be capable for processing audio for a plurality of viewers in parallel. This is particularly true in the use case where the audio recognition/fingerprinting aspect of audio recognition engine 151 is deployed on computer 30 and/or smart phone 55. This use case will minimize the amount of data that is transmitted between the viewer and the remainder of the system 100, however, it may require the use of more sophisticated smart phones or run the risk of slower response times.

As shown in FIG. 1, the audio identification engine 150 sends data regarding the media and entertainment content that the viewer 40 is presently experiencing to the viewer feedback engine 200. Viewer feedback engine 200 is illustrated in more detail in FIG. 3. In particular, viewer feedback engine 200 includes viewer identification engine 301, reward identification engine 305, programming engine 310, reward fulfillment engine 315, and database 330. When the viewer launches the application for the first time (for instance using the application 110 as illustrated in FIG. 6), viewer identification engine 301 is responsible for creating the viewer account (see box 420 of FIG. 4). And then, the viewer identification engine 301 interacts with viewer 40 via the computer software 110 to obtain identification information regarding the viewer 40.

Where the viewer 40 is a first-time user of the system, only very basic user information is preferably gathered by the viewer identification engine 301 at this initial stage of viewer interaction with the system 100. FIGS. 7, 7A and 7B collectively depict one user interface that may be used for initial data collection. As illustrated in FIG. 7, viewer identification engine 301 ensures that viewer 40 accepts the terms and conditions for using system 100 with 1-button opt-in. As shown in FIG. 7, the illustrated user interface provides the viewer 40 with the option to download a copy of the terms and conditions of system use to the viewer's smart phone via the hyperlink. Clicking the checkbox or otherwise indicating assent to those terms and conditions is required by the viewer identification engine 301. FIGS. 7A and 7B illustrates that the viewer may need to be asked to accept other functional aspects to comply with application store requirements. In this example, the questions posed are for permissions that iOS (Apple Computer, Cupertino, Calif.) require of all applications. It should be understood that the example set by the illustrations of FIGS. 7A and 7B may have applicably to other types of permissions that may be required.

Figure 7C:
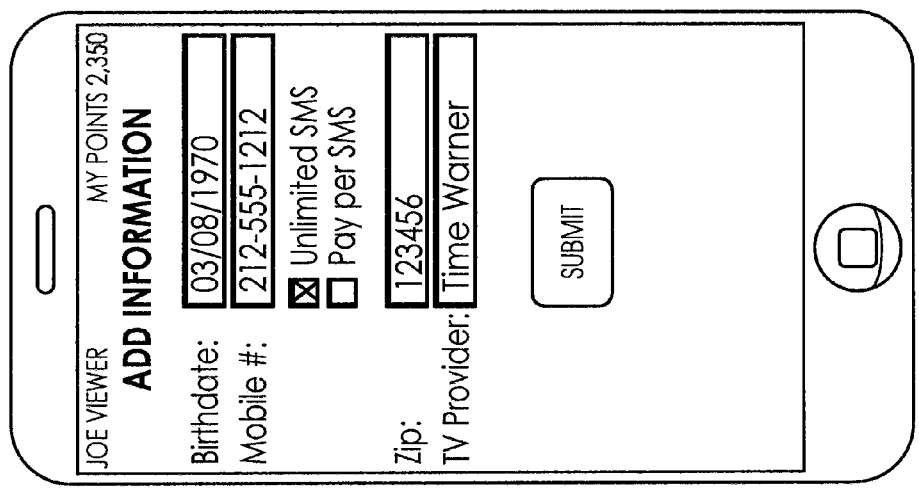
FIG. 7C illustrates an optional user interface in the installed application that may be used in association with the computer application deployed on the exemplary smart phone of FIG. 6 to obtain additional information about the viewer.

FIG. 7C illustrates the possibility that viewer identification engine 301 may later be voluntarily provided additional information by the viewer 40, which may be input on a secondary screen.

The viewer identification engine 301 also provides welcome communication (see FIG. 4, box 430). One illustrative example of the type of initial welcome communication contemplated is shown in FIG. 8. In general, the initial welcome provides immediate points feedback, encourage to obtain more points by just logging into system 100 and checking into a show. Preferably, the initial welcome communication provides an optional opportunity for curious viewers to tour the offering of the system.

The data collected by viewer identification engine 310 is stored in database 330. While database 330 is depicted as a single database, it should be understood by those of ordinary skill in the art having the present specification, drawings, and claims before them that the database 330 may be stored in multiple locations and across multiple pieces of hardware, including but not limited to storage in the cloud. In view of the sensitive data stored in database 330, it will be secured in an attempt to minimize the risk of undesired disclosure of viewer information to third parties.

Viewer identification engine 301 will also be responsible for identifying the viewer 40 in all subsequent interactions within system 100 (see FIG. 4, reference numbers 440 and 460). Once the viewer 40 has been registered with the system 100, the viewer 40 may log off the system (box 445, FIG. 4) and login to interact with the system as they so desire. As further shown in FIG. 4, after some pre-determined milestone, such as one week since registration or forty hours logged into the system, the viewer identification engine 301 in combination with the reward identification engine 305 preferably sends a more detailed welcome message to the viewer 40 (box 450, FIG. 4). This detailed welcome message may include more information about the different opportunities to gain reward points within the system and the variety of ways that those points can be redeemed. The detailed welcome message may also provide information regarding the other rewards that viewers may receive by using the system, such as those provided by the programming engine 310.

When a viewer 40 logs back into the system 100, the viewer identification engine 301 identifies the viewer 40 then begins to obtain and store further data with respect to that viewer 40 for storage in database 330. For instance, the viewer interaction and content watching data would be stored by database 330. In one example, this data may include information that during the current interaction with the system (FIG. 4, 440 or 460), the viewer 40:

was logged into system 100 via their smart phone 55 from 19:00 to 22:30 on Monday, May 23, 2011 from New York, N.Y. according to the GPS locator on smart phone 55;

during this login the viewer 40 watched a basketball game in real time on TBS between the Miami Heat and Chicago Bulls;

interacted with ten fellow viewers of the game on TBS on the Chicago Bulls fan site (created within programming engine 310);

sent a status update to his Facebook® account via computer software 110 on his smart phone 55 at 21:45;

was rewarded ten points for logging into the system, fifty points for watching the game in real time, one-hundred points for interacting on the Chicago Bulls fan site; and ten points for sending a status update for a total of one-hundred and seventy points; and considered redeeming three-hundred points for a Chicago Bulls bumper sticker.

Database 330 may also be used to store the loyalty points given the viewer, the loyalty points used by the viewer, and any rewards provided to the viewer by reward fulfillment engine 315. Database 330 may be queried by the analytics engine 250 (shown in FIG. 1) and will be queried by the reward identification engine 305 and reward fulfillment engine 310.

Figure 3:
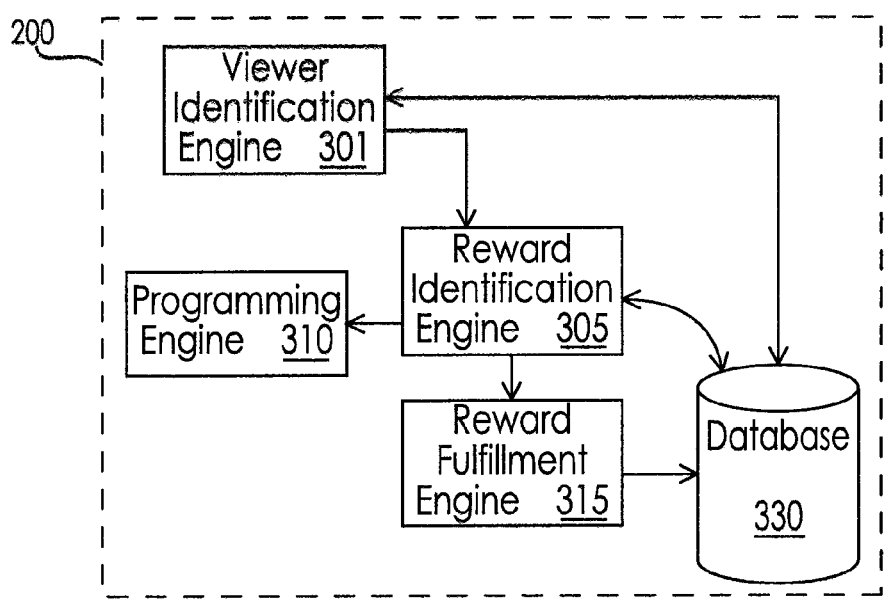
FIG. 3 illustrates some of the details associated with the viewer feedback engine of the system illustrated in FIG. 1.

As shown in FIG. 3, the reward identification engine 305, identifies rewards that will be given to the viewer if the viewer participates in certain behaviors. For instance, as shown in the example above, reward identification engine 305 granted the viewer points for simply logging into the system, watching particular media and entertainment content (e.g. the basketball game) in real time, interacting with the programming engine 310, and sending a status update to social media (e.g. Facebook®) from within the system 100. The point values assigned to each action may be determined by the reward identification engine 305 on a viewer-by-viewer basis depending upon the demographics and prior usage patterns of the viewer 40. The point values may be further adjusted by the interests of media and entertainment content providers in attracted and/or retaining viewers with the demographic and/or usage patterns of the viewer. Based on data stored in database 330, the reward identification engine 305 may have provided a text message via computer application 110 or an email to the viewer to encourage that viewer to participate in the social network within the programming engine 310.

Figure 5:
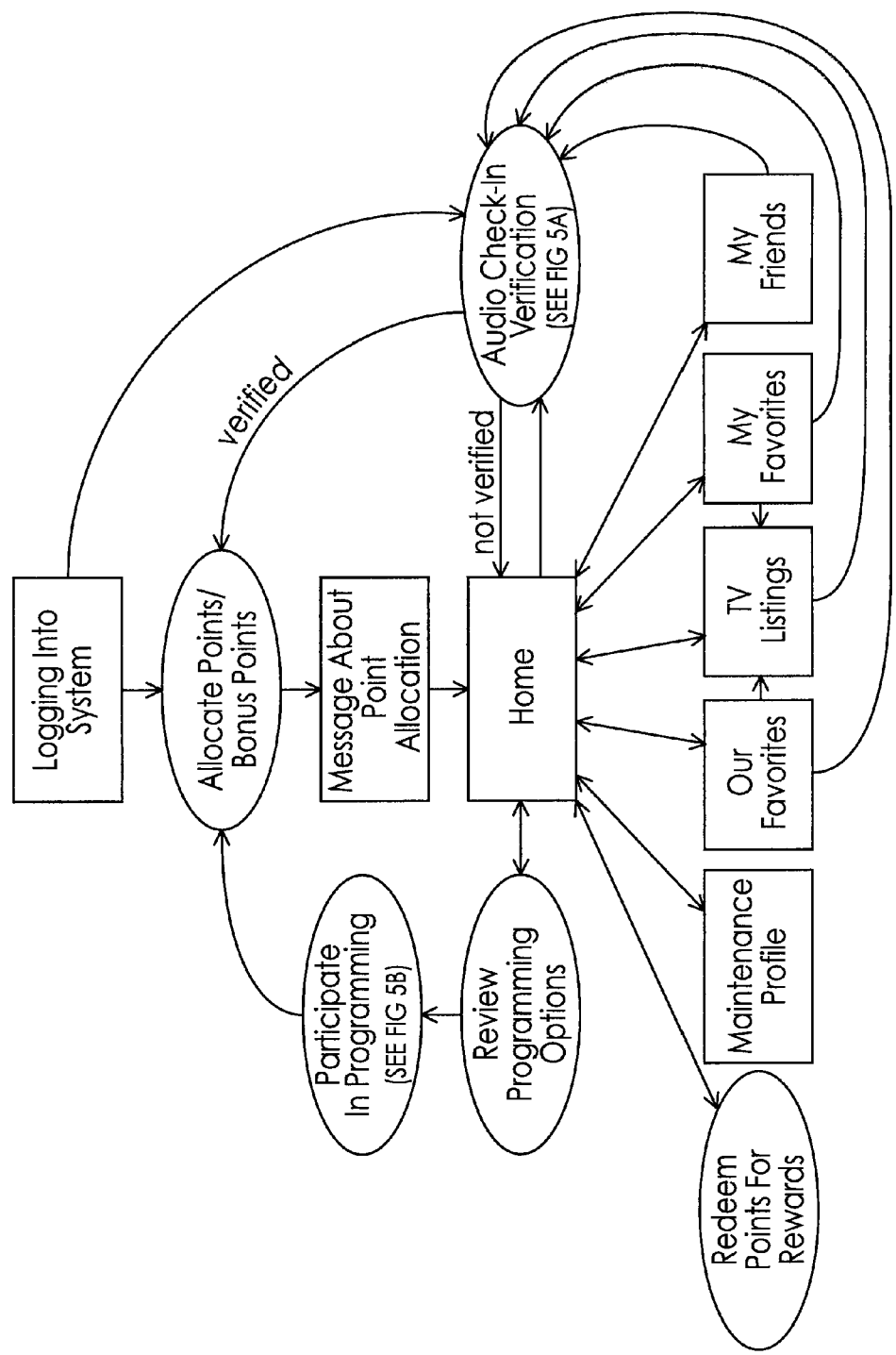
FIG. 5 illustrates a flow diagram of the potential interactions a viewer may have in association with one embodiment of the system illustrated in FIG. 1.

FIG. 5 illustrates one potential flow for interaction of viewer 40 with the system (boxes 440, 460 of FIG. 4). As illustrated in FIG. 5, when a viewer logs into the system they may be immediately checking into a media or entertainment show. If the viewer successfully logs into a show (i.e. "verified"), then a screen similar to the one illustrated in FIG. 11A is generated. Alternatively, the viewer may just be logging into the system. In which case, the viewer is allocated points and then receives a message about the point allocation that may be similar to the initial welcome message depicted in FIG. 8. Following the point allocation message, the viewer may continue onto the "home screen." One potential embodiment of the "home screen" has been illustrated in FIG. 9. As illustrated in FIGS. 5 and 9, the viewer may use the "home screen" to commence various tasks. For instance, the viewer may maintain their viewer profile and even add additional information, such as their supermarket loyalty rewards card number (see, e.g., FIG. 7C).

Figure 10:
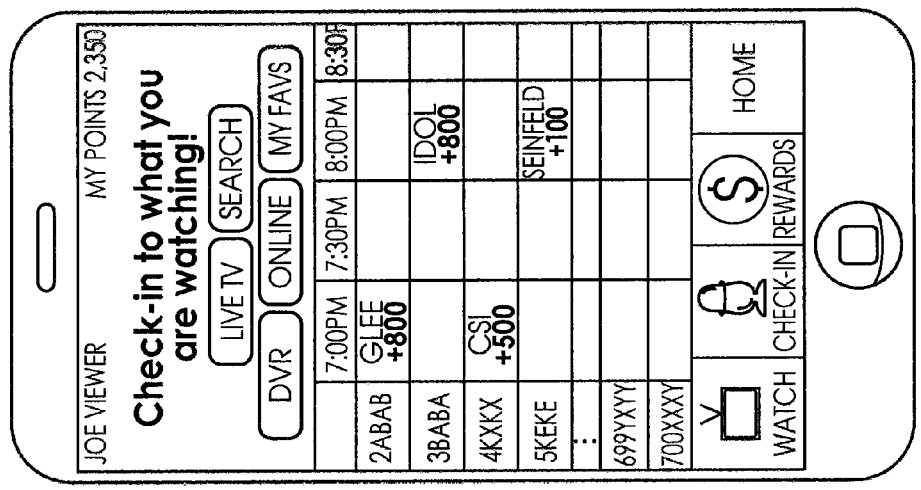
FIG. 10 illustrates one user interface approach to a "check-in" screen in the installed application that may be used in association with the exemplary smart phone of FIG. 6.
Figure 15A:
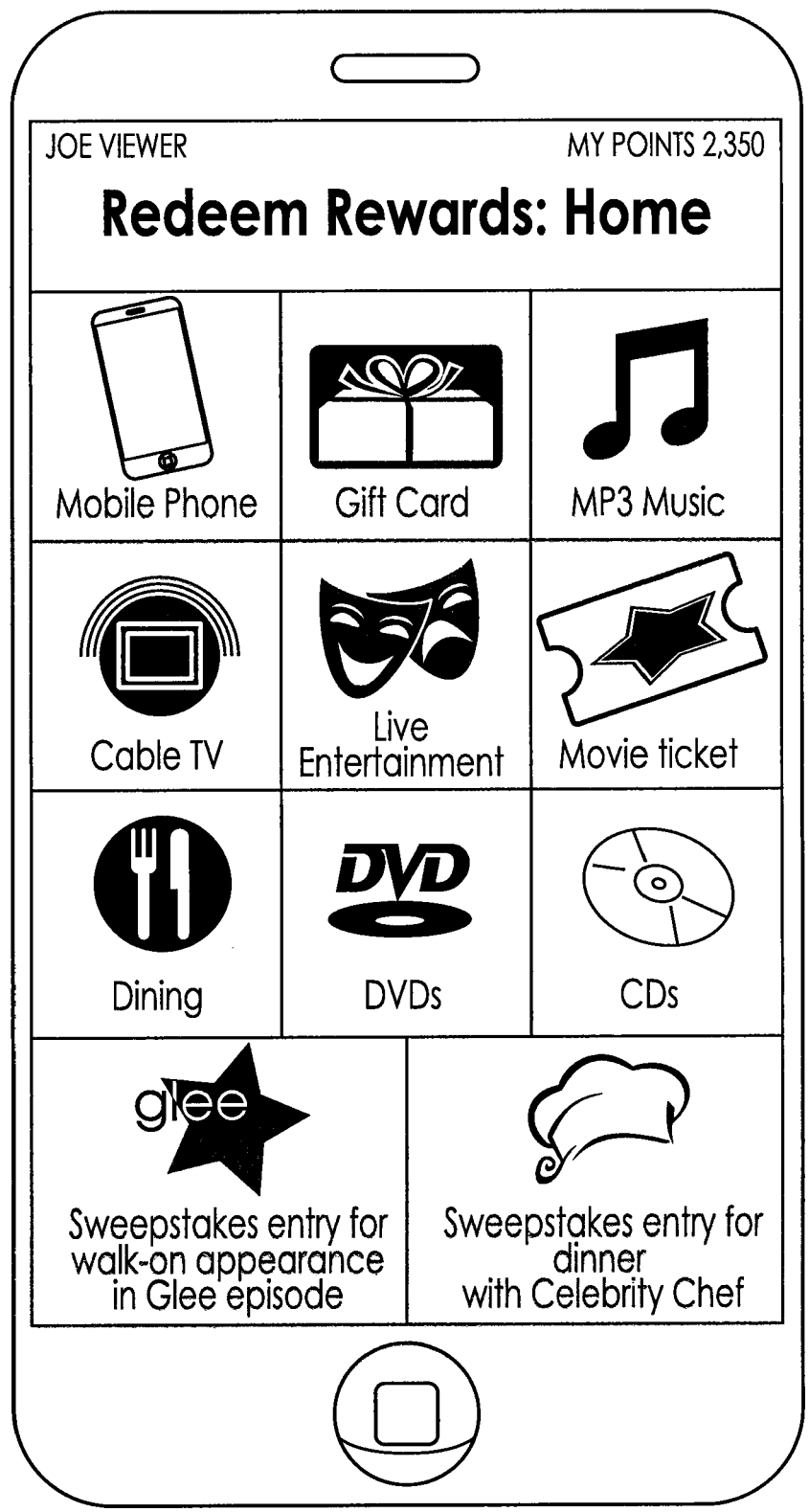
Figure 15B:

In another example, the viewer 40 may review the current TV listings as a launch point to check into selected a show. One potential interface for such a TV listings launch screen is depicted in FIG. 10. As further depicted in FIG. 5, the viewer may return from the TV listings screen back to the home screen. The viewer may also navigate between the TV listings screen and screens that focus on the viewer's own favorite shows (see FIG. 13), the system-manager's favorite shows ("Our Favorites") and the viewer's friends' favorite shows ("My Friends"). The viewer may also launch search windows from within the TV listings (see, e.g. FIGS. 14A and 14B).

Figure 5B:
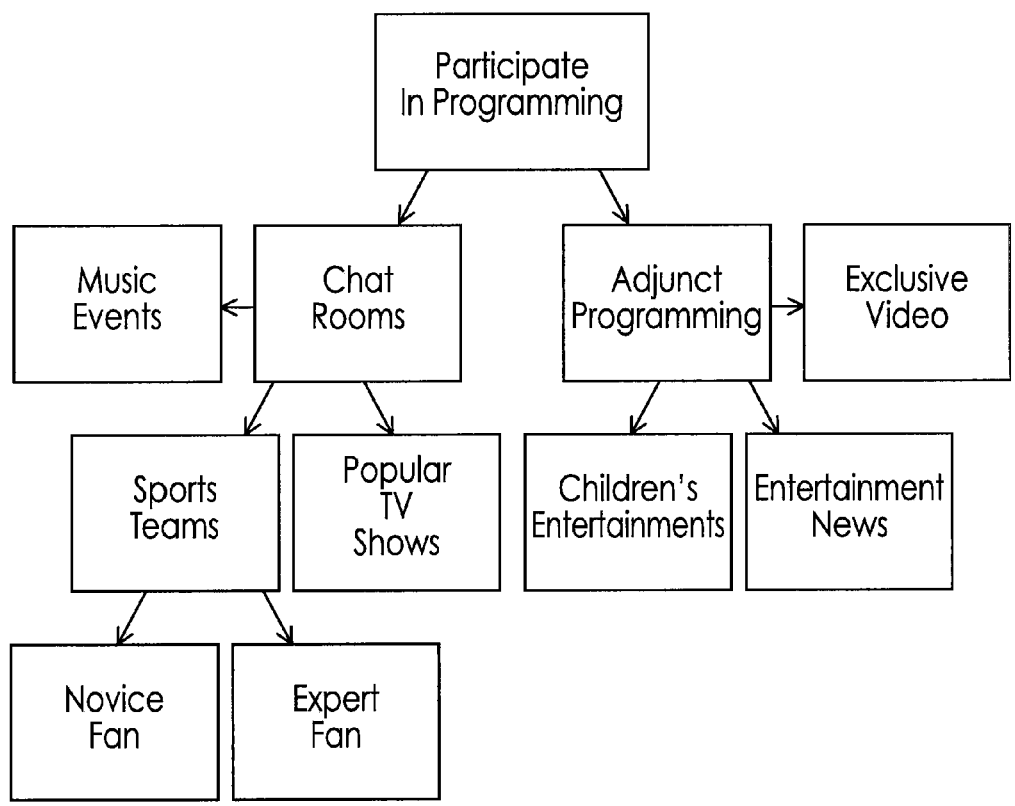
FIG. 5B illustrates the potential programming options that a viewer may choose to participate in, in one embodiment of the system illustrated in FIG. 1.

As illustrated in FIG. 5B and would be understood by those of ordinary skill in the art having the present specification, drawings, and claims before them, the programming engine 310 could establish separate fan sites (or chat rooms) for sporting teams and may further separate the fan sites by information regarding the frequency that the viewer watches that type of sporting event (i.e. novice or expert basketball viewers). By inviting viewer 40 to the expert basketball social site, it may encourage the viewer to spend more time logged into the system 100. These fan sites may be similarly provided for music events and popular TV shows (as may be defined by the data collected from the viewers or as may be defined by the interest of a media or entertainment content provider who is interested in establishing a show as "popular"), among other potential examples.

A portion of one potential fan site is depicted in FIG. 11D. In the illustrated case the fan site relates to the particular "American Idol" episode where viewers are chatting about the show as they watch. As would be understood by those skilled in the art, the smart phone 55 allows a viewer to swipe the screen with an upward or downward motion to scroll the chat content through the visible window on the smart phone. As would be understood by those of ordinary skill in the art, other smart phones and devices may have different navigation techniques to allow the viewer to navigate through the chat content.

In another example, the programming engine 310 may provide children's programming that dovetails with a particular educational program that the viewer may be watching with their child in real-time. In such a case, the reward identification engine 305 may read from the audio identification engine that a child of the viewer 40 (viewers in the system must be at least 13 years of age or older) is watching a supported children's educational program and send various forms of messages to encourage the viewer to engage with the value-added programming available via the programming engine 310 of the system 100. Similar examples may be formed around entertainment news and the provision of exclusive video (e.g. interviews with the stars of a particular show, a music video related to a movie, etc.)

In yet another example, the programming engine 310 may establish media and entertainment programming related fan sites in real-time. The reward identification engine 305 may then invite particular viewers to join the real-time chat (via emails, SMS messages and/or in-program messages) based on information obtained from the viewer identification engine 301 and database 330.

Returning to FIG. 5, when the viewer has finished their participation in the programming, the system determines whether points should be allocated and if so awards them. In one approach, the system may issue a message about the point allocation before returning the viewer to the home screen (see FIG. 9). Alternatively, the points may simply be incremented and the viewer returned directly to the home screen.

From the home screen, the viewer may choose to redeem points for rewards via the reward fulfillment engine 315. The reward fulfillment engine 315 may fulfill rewards via electronic credits sent to other electronic systems via the computer network 60 (such as the iTunes or Amazon.com), via regular mail (including private parcel services), or via the cellular telephone system 50. In particular, where the viewer 40 chooses to receive a reward via regular mail, the viewer identification engine 301 will collect complete postal address information regarding the viewer 40 because the system 100 may have only previously obtained zip code data (see FIG. 7).

This postal data would be saved in database 330 along with the other data regarding the viewer 40. As shown in FIGS. 15A-15E there are a variety of rewards that may be managed and offered by reward fulfillment engine 315, which will be discussed in association with FIGS. 15A-15E below.

As shown in FIG. 4, after various periods of time, the system 100 may communicate with the viewer 40, reference number 470. These communications may be during interactions with the system 460, but they are more likely to be between interactions with the system to encourage the viewer 40 to return to the system. Preferably, these periodic communication will be sent within the application 110. However, particularly if the viewer has not launched application 110, it is contemplated that these periodic communications may be sent via the cellular telephone system 50, as SMS or MMS messages (if the viewer has opted-in to receive such messages (see FIG. 7A), or via the computer network 60 as emails and/or instant messages.

The screen shots of FIGS. 6 through 16 collectively illustrate one potential flow of the application 110 on one particular type of smart phone. In particular, these screen shots are depicted on a smart phone that includes a touch sensitive screen, such that activation of any depicted button merely requires the touch of a finger or stylus within the real-estate encompassed by that button. In one approach to the user interface, many of the screens, such as those in FIGS. 8 through 15 include common user interface elements, such as the viewer name in the upper left hand corner of each screen and the viewer's current reward point total in the upper right hand corner, and (in many views) the navigation buttons along the bottom. This uniformity between various screens of the user interface simplifies the user interaction with the system. With respect to the bottom navigation buttons, they provide quick links to Watch TV (i.e. select a show via the interface of FIG. 10); audio check-in (FIG. 8A); the rewards home page (FIG. 15A); and the home page (FIG. 9). As should be understood by those of ordinary skill in the art the particular look and feel, text, the ordering of the information may not be necessary to implement the inventive concepts disclosed herein.

FIG. 6 illustrates a launch screen for application 110 according to one embodiment of the invention. As illustrated here, the viewer may create an account, either through the application directly, or through another media or social networking website, such as (by way of example only) TWITTER,™ FACEBOOK™ or LINKEDIN.™ While not shown, the introductory screen may include a "login" link (not shown) for user with existing accounts. As discussed with reference to FIG. 4 above, the viewer 40 may arrive at the screen of FIG. 6 by, among other paths, selecting a link for a website from the browser of his/her smart phone. Alternatively, the viewer may download an application from an "app store" (such as an "app store" specific to the user's smart-phone operating system or platform). Once the application is downloaded, the user/viewer can open up the application directly from the user's smart phone.

As shown in FIGS. 7, 7A and 7B, the account creation screen will request only the most basic user information (e.g. First Name, Last Name, email and password). It is important that only this basic information is requested to streamline the enrollment process so as to minimize the potential of losing potential adopters during the enrollment process. It is contemplated that additional information about the viewer 40 may be voluntarily collected from the viewer, with the viewer 40 earning additional loyalty points for supplying each aspect of additional information. This additional information collection is depicted in FIG. 7C to include mobile number, type of SMS plan the user has, Zip Code, and/or TV Provider. Depending on the embodiment of the system 100, some or all of these categories of information, or other categories of information may be requested, and the illustrations of FIGS. 7, 7A, 7B, and 7C should not be construed to limit the invention in any way.

FIG. 9 illustrates an example of a home screen. As illustrated in FIG. 9, the home screen may include a number of menu items, including without limitation: Check-In (navigating to the user interface of FIG. 8A and enabling the check-in process illustrated in FIG. 5A), My Favorites (navigate to the user interface of FIG. 13), My Friends (a user interface like FIG. 13, but listing the favorite shows selected by the friends of the viewer 40), Rewards (navigate to the user interface of FIG. 15A), Our Favorites, Earn More Bonus Points, My Profile (navigate to the user interface of FIG. 12), Notifications, and Settings.

The "Our Favorites" button depicted in FIG. 9 would navigate to a user interface similar to that of FIG. 13, but listing the "favorites" of the system-editors, which may be selected on a viewer-by-viewer basis based on the information regarding the viewer 40 contained in database 330 and relationships between system 100 and various content owners and/or advertisers.

The "Earn More Bonus Points" button illustrated in FIG. 9, would take the viewer to a screen that provides point earning opportunities (such as the types of opportunities depicted in FIG. 11B). These opportunities may be selected on a viewer-by-viewer basis based on the information regarding the viewer 40 in database 330 and relationships between system 100 and various content owners and/or advertisers.

The "Notifications" button illustrated in FIG. 9, would take the viewer to a screen that provides notices from the system and advertisers. As shown in FIG. 9, merely pressing this button would have added 3 loyalty points into the viewer's account. The notices that are provided in the notification screen may be selected on a viewer-by-viewer basis based on the information regarding the viewer in database 330 and relationships between system 100 and various content owners and/or advertisers.

As shown in FIG. 9, one implementation of the "home screen" may include buttons that offer featured rewards across the bottom of the user interface screen instead of the standard navigation buttons discussed above. On the home screen, this substitution makes particular sense because the standard soft-navigation keys are already provided elsewhere on the "home screen." By selecting any of the featured rewards the viewer 40 is taken to a detailed rewards page, such as the type of pages depicted in FIGS. 15C and 15D.

FIG. 10 illustrates one potential version of a "check in" interface. As illustrated in FIG. 10, by pressing the portion of the TV listing grid with "CSI," "IDOL," or "GLEE" the viewer would check-in the selected program and receive an addition number of loyalty points upon confirmed check-in (via audio identification engine 150). As further illustrated in FIG. 10, other programming may be selected from this familiar guide grid format that may be laid out in the order deployed by the viewer's TV provider (e.g. AT&T, Cablevision, Charter, Comcast, Cox, Time Warner) if that provider was identified by the viewer (see FIG. 7C).

FIG. 11A provides an illustration of a screen that could appear following a successful check in of the viewer 40 by the audio identification engine 150. As illustrated, the screen may provide feedback on the amount of points added (i.e. 50 points) due to the viewer's selected behavior and further positive feedback about the viewer's participation in the system. FIG. 11B depicts the user interface following the viewer 40 pressing the "Bonus Points" ribbon on FIG. 11A. By doing so, the system 100, provides access to additional opportunities to earn points. FIG. 11C depicts the user interface following the viewer 40 pressing the "Who's Hot Tonight" bonus point opportunity button on FIG. 11B. Also illustrated in FIG. 11A is the ability to post status information regarding the content the viewer is watching via an easy interface to various social media/networking sites such as Facebook, Twitter, etc. (see FIG. 11D).

FIG. 13 provides an illustration of one potential screen that shows the viewer's favorite shows. As further illustrated the viewer may decide to share their list of favorite shows via various social media outlets.

FIGS. 14A and 14B provide an illustration of the search potential in the present invention. FIG. 14A shows search for programming on live television, while FIG. 14B depicts the ability to search for programming contained in a selected one of the online content providers. By providing the ability to select the online service, the system 100 may be able to streamline the audio fingerprint search associated with audio check-in to include only the programming available via the selected online service.

As illustrated with respect to FIGS. 15A through 15F, the reward account may include points that can be redeemed for rewards, cash or store credits, or other cash equivalent rewards (e.g. send restaurant/retailers/grocery gift card, offer pay a portion of the cable bill, pay a portion of mobile phone bill, donation to charity, a movie ticket coupon); tangible prizes (such as selected directly from an on-line catalog, won in an on-line auction, won as part of a sweepstakes); incentives prizes (e.g. drawn into a particular television show or video, exclusive video content, free ring tones); and any combination of the foregoing, or other similar types of promotional or loyalty rewards.

For instance, FIGS. 15A through 15F illustrate some of the diversity of rewards offered by the present system. For instance, one reward may consist of mobile phone offers, such as paying a portion of the monthly cell phone bill or paying for unlimited SMS messaging. Another similar potential reward offering is payment of a portion of the cable bill, such as the basic subscription fee, or for a particular on-demand or pay-per-view movie. Here, the viewer 40 has selected the "Rewards" button to navigate to the user interface of FIG. 15A. As illustrated, the categories of reward offers fills the visible screen (and probably continues onto virtual screens that may be accessed by swiping a finger across the screen of smart phone 55. If the viewer 40 selects the "gift card" category, the user interface shifts to FIG. 15B where a variety of gift cards are displayed. In the illustrated example, the available gift card offerings all fit within the single screen. The viewer 40 selects a particular gift card offer, such as the $10 iTunes® gift card via regular mail offer causing the user interface to shift to FIG. 15C. As illustrated on FIG. 15C, the type of reward (e.g. $10 iTunes® gift card via regular mail), the number of point necessary to "buy" the reward, and a description of the reward (and any special terms and conditions) are displayed. As also illustrated, once the viewer 40 has decided that they want the reward, they press the "Redeem" button, which will debit the reward point account of viewer 40. As further illustrated in FIG. 15C, the system may provide the viewer 40 with a potential alternative acquisition (e.g. an electronic iTunes® gift card for fewer points).

FIG. 15D provides an illustration of potential user interface to offer a sweepstakes reward opportunity. As illustrated in FIG. 15D, the user interface provides a description of the reward and the number of points needed to enter the sweepstakes. As further depicted, the system may inform the viewer of the current number of entries in the sweepstakes and the time remaining to enter. Reward points are deducted upon entry into the sweepstakes regardless of whether the viewer wins.

FIG. 15E provides an illustration of potential user interface to offer an online auction reward option. As illustrated, the user interface in FIG. 15E provides a description of the reward, an opening bid, a current bid, and the remaining time to enter a bid. As would be understood, bid entry would be limited to amounts that are greater then the current bid. Even if a bid is acceptable, the reward points will only be deducted if the viewer 40 wins the auction.

Data regarding each user's point redemption activities may be utilized to capture user preferences, including but not limited to, brand preferences. For example, a user redeeming points for a Coca Cola T-shirt may indicate a preference for Coke. Similarly, redemption for a 4-pack of razor blades may indicate a desire for a particular product as approved by others.

Figure 16:
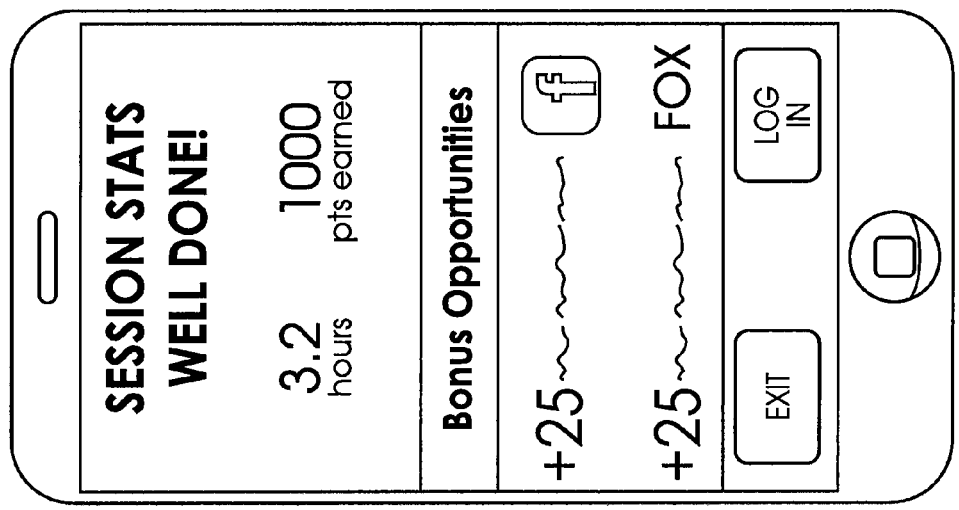
FIG. 16 illustrates one user interface approach to a logout screen in the installed application that would preferably be used in association with the computer application deployed on the exemplary smart phone of FIG. 6.

FIG. 16 illustrates one user interface approach to a simplified "logout" screen. In particular, after a viewer has chosen to logout of the system they are provided with information about the just terminated session and offers to earn more points. In addition, the logout screen provides a simple way to log back into the system.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

To the extent that any of the claims appended hereto are construed to be means plus function claims under 35 U.S.C. §112, sixth paragraph, one of ordinary skill in the art would understand that the means includes code running on a processor to perform the desired function.

What is claimed is:

1. A system for rewarding a viewer for engaging with entertainment comprising:
   a database for storing a viewer account associated with the viewer;
   a viewer identification engine that interacts with and obtains information from the viewer, the viewer identification engine populating the viewer account;
   an audio capture program deployed local to the viewer, the audio capture program being in operable association with a microphone and a user interface that provides for activation of the microphone such that an audio segment is captured from the entertainment as part of a check-in process associated with the entertainment;
   an audio identification engine operably connected to the audio capture program to receive the captured audio segment and compare the captured audio segment to known audio segments associated with known entertainment to identify the entertainment and for checking into the identified entertainment;
   a viewer feedback engine operably connected to the user interface such that the viewer is provided with feedback regarding the viewer's engagement with the checked into entertainment, wherein the feedback provides incentives to the viewer;
   a reward identification engine operably connected to the audio identification engine and the viewer identification engine, said reward identification engine for identifying an awardable action associated with the checked into entertainment, tracking the viewer's interaction with the system, and assigning the loyalty points based on that interaction and the awardable action; and a reward fulfillment engine that facilitates the viewer's redemption of the loyalty points for rewards and distributes the rewards.

2. The system according to claim 1 wherein the user interface operably associated with the audio capture program provides for manual activation of the microphone.

3. The system according to claim 2 wherein the audio capture program converts the captured audio segment to an audio fingerprint.

4. The system according to claim 3 wherein the audio fingerprint is smaller than the captured audio segment from which it is converted and the conversion takes place local to the viewer.

5. The system according to claim 3 wherein the user interface operably associated with the audio capture program provides for multiple manual activations of the microphone.

6. The system according to claim 4 wherein the viewer identification engine initially obtains only basic viewer information.

7. The system according to claim 6 wherein the reward fulfillment engine provides a plurality of rewards for redemption with a number of loyalty points.

8. The system according to claim 7 wherein one of the plurality of rewards is a tangible prize, the viewer identification engine obtains a mailing address from the viewer for mailing the tangible prize.

9. The system according to claim 8 wherein a second of the plurality of rewards is an electronic prize, the viewer identification engine obtains an electronic address from the viewer for providing the electronic prize.

10. The system according to claim 9 wherein the reward identification engine provides loyalty points to a viewer for performing a selected activity.

11. The system according to claim 10 wherein the activity is selected from the group consisting of watching a broadcast for a number of consecutive weeks, interacting with the broadcast, interacting with advertisements, sharing information about the broadcast, chatting with other viewers during the broadcast, participation in a social network, referring other viewers, activating the audio capture program, viewing a newsletter, and providing additional viewer profile information and combinations thereof.

12. The system according to claim 11 wherein the additional viewer profile information is selected from the group consisting of an e-mail address, a Facebook account, a Twitter account, a mobile phone number, third party loyalty card numbers, and combinations thereof.

13. The system according to claim 12 wherein the reward identification engine adjusts the loyalty points on a viewer-by-viewer basis for each activity based on data in the viewer account.

14. The system according to claim 13 wherein the reward fulfillment engine adjusts the plurality of rewards available to the viewer on a viewer-by-viewer basis based on data in the viewer account.

15. The system according to claim 1 wherein the reward identification engine provides loyalty points to a viewer for performing a selected activity.

16. The system according to claim 15 wherein the activity is selected from the group consisting of watching a broadcast for a number of consecutive weeks, interacting with the broadcast, interacting with advertisements, sharing information about the broadcast, chatting with other viewers during the broadcast, participation in a social network, referring other viewers, activating the audio capture program, viewing a newsletter, and providing additional viewer profile information and combinations thereof.

17. The system according to claim 16 wherein the additional viewer profile information is selected from the group consisting of an e-mail address, a Facebook account, a Twitter account, a mobile phone number, third party loyalty card numbers and combinations thereof.

18. The system according to claim 17 wherein the reward identification engine adjusts the loyalty points for each activity on a viewer-by-viewer basis based on data in the viewer account.

19. The system according to claim 18 wherein the reward fulfillment engine adjusts the plurality of rewards available to the viewer on a viewer-by-viewer basis based on data in the viewer account.

20. The system according to claim 1 wherein the viewer identification engine sends personalized communications to the viewer on a viewer-by-viewer basis based on data in the viewer account to incentivize the viewer to log into the system.

21. The system according to claim 1 further comprising an analytical engine operably connected to the viewer feedback engine to analyze information obtained about the viewer.

22. The system according to claim 21 further comprising a programming engine operably connected to the reward identification engine to provide viewers with entertainment and advertisements based on information from the analytical engine.

23. The system according to claim 21 further comprising a programming engine operably connected to the reward identification engine to provide viewers with advertisements based on information from the analytical engine.

24. A system for rewarding a viewer for engaging with entertainment comprising:

a database for storing a viewer account;

a viewer identification engine that interacts with and obtains information from the viewer, the viewer identification engine populating the viewer account, wherein the view identification engine is configured to send communications to the viewer to incentivize the view to log into the system;

an audio capture program deployed local to the viewer, the audio capture program being in operable association with a microphone such that an audio segment is captured from the entertainment as part of a check-in process associated with the entertainment;

an audio identification engine operably connected to the audio capture program to receive the captured segment and compare the captured segment to known segments associated with known entertainment in a database to identify the entertainment and for checking into the identified entertainment;

a viewer feedback engine operably connected to the user interface such that the viewer is provided with feedback regarding the viewer's engagement with the checked into entertainment, wherein the feedback provides incentives to the viewer;

a reward identification engine operably connected to the viewer identification engine that identified an awardable action associated with the checked into entertainment, tracks the viewer's interaction with the system, and assigns loyalty points based on that interaction and the awardable action, wherein the reward identification engine provides for adjusting the loyalty points on a viewer-by-viewer basis based on data in the viewer account; and a reward fulfillment engine that facilitates the viewer's redemption of the loyalty points for rewards and distributes the rewards.

25. The system according to claim 24 wherein the audio capture program converts the captured audio segment to an audio fingerprint.

26. The system according to claim 25 wherein the audio fingerprint is smaller than the captured audio segment from which it is converted and the conversion takes place local to the viewer.

27. The system according to claim 26 wherein the viewer identification engine initially obtains only basic viewer information.

28. The system according to claim 27 wherein the reward fulfillment engine provides a plurality of rewards for redemption with a number of loyalty points.

29. The system according to claim 28 wherein one of the plurality of rewards is a tangible prize and wherein the viewer identification engine obtains a mailing address from the viewer for mailing the tangible prize to the viewer.

30. The system according to claim 29 wherein a second of the plurality of rewards is an electronic prize and wherein the viewer identification engine obtains an electronic address from the viewer for providing the electronic prize to the viewer.

31. The system according to claim 30 wherein the reward identification engine provides loyalty points to a viewer for performing a selected activity.

32. The system according to claim 31 wherein the activity is selected from the group consisting of watching a broadcast for a number of consecutive weeks, interacting with the broadcast, interacting with advertisements, sharing information about the broadcast, chatting with other viewers during the broadcast, participation in a social network, referring other viewers, activating the audio capture program, viewing a newsletter, and providing additional viewer profile information and combinations thereof.

33. The system according to claim 32 wherein the additional viewer profile information is selected from the group consisting of an e-mail address, a Facebook account, a Twitter account, a mobile phone number, third party loyalty card numbers and combinations thereof.

34. The system according to claim 33 wherein the reward identification engine adjusts the loyalty points for each activity on a viewer-by-viewer basis based on data in the viewer account.

35. The system according to claim 34 wherein the reward fulfillment engine adjusts the plurality of rewards available to the viewer on a viewer-by-viewer basis based on data in the viewer account.

36. The system according to claim 24 wherein the reward identification engine provides loyalty points to a viewer for performing a selected activity.

37. The system according to claim 36 wherein the activity is selected from the group consisting of watching a broadcast for a number of consecutive weeks, interacting with the broadcast, interacting with advertisements, sharing information about the broadcast, chatting with other viewers during the broadcast, participation in a social network, referring other viewers, activating the audio capture program, viewing a newsletter, and providing additional viewer profile information and combinations thereof.

38. The system according to claim 37 wherein the additional viewer profile information is selected from the group consisting of an e-mail address, a Facebook account, a Twitter account, a mobile phone number, third party loyalty card numbers and combinations thereof.

39. The system according to claim 38 wherein the reward identification engine adjusts the loyalty points for each activity on a viewer-by-viewer basis based on data in the viewer account.

40. The system according to claim 39 wherein the reward fulfillment engine adjusts the plurality of rewards available to the viewer on a viewer-by-viewer basis based on data in the viewer account.

41. The system according to claim 24 wherein the viewer identification engine sends personalized communications to the viewer based on data in the viewer account on a viewer-by-viewer basis to incentivize the viewer to log into the system.

42. The system according to claim 24 further comprising an analytical engine operably connected to the viewer feedback engine to analyze information obtained about the viewer.

43. The system according to claim 42 further comprising a programming engine operably connected to the reward identification engine to provide viewers with entertainment and advertisements based on information from the analytical engine.

44. The system according to claim 42 further comprising a programming engine operably connected to the reward identification engine to provide viewers with advertisements based on information from the analytical engine.

45. A system for rewarding a viewer for engaging with entertainment comprising:
a database for storing a viewer account;
a viewer identification engine that interacts with and obtains information from the viewer, the viewer identification engine populating the viewer account with information provided by the viewer or obtained during the viewer's interaction with the system;
an audio capture program deployed local to the viewer, the audio capture program being in operable association with a microphone such that an audio segment is captured from the entertainment as part of a check-in process associated with the entertainment;
an audio identification engine operably connected to the audio capture program to receive the captured segment and compare the captured segment to known segments associated with known entertainment in a database to identify the entertainment and for checking into the identified entertainment;
a viewer feedback engine operably connected to the user interface such that the viewer is provided with feedback regarding the viewer's engagement with the checked into entertainment, wherein the feedback provides incentives to the viewer;
a reward identification engine operably connected to the viewer identification engine that identifies an awardable action associated with the checked into entertainment, tracks the viewer's interaction with the system and assigns the loyalty points based on that interaction and the awardable action; and
a reward fulfillment engine that facilitates the viewer's redemption of the loyalty points for rewards and distributes the rewards, wherein the reward fulfillment engine provides for adjusting a plurality of rewards available to the viewer on a viewer-by-viewer basis for redemption with a number of loyalty points based on data from the viewer account.

46. The system according to claim 45 wherein the audio capture program converts the captured audio segment to an audio fingerprint.

47. The system according to claim 46 wherein the audio fingerprint is smaller than the captured audio segment from which it is converted and the conversion takes place local to the viewer.

48. The system according to claim 47 wherein the viewer identification engine initially obtains only basic viewer information.

49. The system according to claim 48 wherein the plurality of rewards is selected from the group consisting of cash, a gift card, a store credit, bill payment, a donation to charity, a movie ticket, a tangible prize, an electronic prize, an incentive prize, an entry to a sweepstakes, and an online auction.

50. The system according to claim 49 wherein the viewer identification engine sends personalized communications to the viewer based on data in the viewer account on a viewer-by-viewer basis to incentivize the viewer to log into the system.

51. The system according to claim 50 further comprising an analytical engine operably connected to the viewer feedback engine to analyze information obtained about the viewer.

52. A method of rewarding a viewer for engaging with entertainment comprising:

capturing an audio segment from the entertainment upon viewer activation of a microphone associated with an audio capture program as part of a check-in process associated with the entertainment;

comparing, by a processor, the captured segment to known segments associated with known entertainment to identify the entertainment and for checking into the identified entertainment;

providing the viewer with feedback regarding engagement with the checked into entertainment, wherein the feedback provides incentives to the viewer;

interacting with the viewer to obtain information about the viewer;

identifying an awardable action associated with the checked into entertainment;

tracking the viewer's interaction with the system and assigning loyalty points based on the viewer's interaction with the system and the awardable action; and facilitating the viewer's redemption of the loyalty points for rewards.

53. The method of claim 52 wherein facilitating the viewer's redemption of loyalty points includes sending a real-world reward to the viewer.

* * * * *